US012808644B2

(12) United States Patent
Luo et al.

(10) Patent No.: US 12,808,644 B2
(45) Date of Patent: Nov. 24, 2026

(54) TAPE MEASURE, MEASURING DEVICE, AND MEASURING METHOD

(71) Applicant: Shenzhen Mileseey Technology Co., Ltd., Shenzhen (CN)

(72) Inventors: Long Luo, Shenzhen (CN); Zhi Chou, Shenzhen (CN)

(73) Assignee: Shenzhen Mileseey Technology Co., Ltd., Shenzhen (CN)

( * ) Notice: Subject to any disclaimer, the term of this patent is extended or adjusted under 35 U.S.C. 154(b) by 422 days.

(21) Appl. No.: 18/421,959

(22) Filed: Jan. 24, 2024

(65) Prior Publication Data

US 2025/0155231 A1 May 15, 2025

Related U.S. Application Data

(63) Continuation of application No. PCT/CN2023/141877, filed on Dec. 26, 2023.

(30) Foreign Application Priority Data

Nov. 10, 2023 (CN) ......................... 202311498172.1
Nov. 10, 2023 (CN) ......................... 202311500213.6
(Continued)

(51) Int. Cl.
*G01B 3/102* (2020.01)
*G01B 3/1041* (2020.01)
(Continued)

(52) U.S. Cl.
CPC ........... *G01B 3/1061* (2013.01); *G01B 3/102* (2020.01); *G01B 3/1041* (2013.01); *G06T 7/248* (2017.01); *H04N 23/54* (2023.01); *H04N 23/57* (2023.01)

(58) Field of Classification Search
CPC .... G01B 3/1061; G01B 3/102; G01B 3/1041; G06T 7/248; H04N 23/54; H04N 23/57
See application file for complete search history.

(56) References Cited

U.S. PATENT DOCUMENTS 8,732,974 B2 * 5/2014 Jayanetti ............. G01B 3/1061 33/760
2014/0090264 A1 4/2014 Li-Yu
(Continued)

FOREIGN PATENT DOCUMENTS

CN 103673801 A 3/2014
CN 104677221 A 6/2015
(Continued)

OTHER PUBLICATIONS

International Search Report.

*Primary Examiner* — Yaritza Guadalupe-McCall

(57) ABSTRACT

A tape measure, a measuring device, and a measuring method are provided. The tape measure includes a first shell, a tape, an optical positioning assembly, and a first controller. The tape has one end mounted in the first shell and the other end extending out of the first shell and capable of moving in a first measuring direction relative to the first shell. An imaging sensor in the optical positioning assembly, when working, is capable of consecutively acquiring images of the tape in a moving process and then performing feature comparison on the images to determine a relative displacement of the tape moving in the first measuring direction in real time. Further, the controller of the tape measure is capable of determining, based on the relative displacement, a length by which the tape extends out of the first shell.

20 Claims, 22 Drawing Sheets

(30) Foreign Application Priority Data

| | | |
|---|---|---|
| Nov. 10, 2023 | (CN) | 202311500390.4 |
| Nov. 10, 2023 | (CN) | 202311502442.1 |
| Nov. 10, 2023 | (CN) | 202311506968.7 |

(51) Int. Cl.

| | |
|---|---|
| ***G01B 3/1061*** | (2020.01) |
| ***G06T 7/246*** | (2017.01) |
| *H04N 23/54* | (2023.01) |
| *H04N 23/57* | (2023.01) |

(56) References Cited

U.S. PATENT DOCUMENTS

| | | | | |
|---|---|---|---|---|
| 2019/0094001 | A1* | 3/2019 | Murray | G01B 3/1084 |
| 2022/0390220 | A1* | 12/2022 | Tecu | G01D 7/12 |
| 2025/0155231 | A1* | 5/2025 | Luo | G01B 3/1061 |
| 2025/0327650 | A1* | 10/2025 | Donnell | G01B 3/56 |
| 2026/0049805 | A1* | 2/2026 | Oikonomopoulos | G01B 3/1089 |

FOREIGN PATENT DOCUMENTS

| | | | | | |
|---|---|---|---|---|---|
| CN | 106595493 | A | | 4/2017 | |
| CN | 107144195 | A | * | 9/2017 | G01B 3/1069 |
| CN | 107976682 | A | | 5/2018 | |
| CN | 207423161 | U | | 5/2018 | |
| CN | 207730100 | U | | 8/2018 | |
| CN | 208443280 | U | | 1/2019 | |
| CN | 109357579 | A | * | 2/2019 | G01B 3/1069 |
| CN | 109990676 | A | | 7/2019 | |
| CN | 209371910 | U | | 9/2019 | |
| CN | 210512919 | U | | 5/2020 | |
| CN | 112082442 | A | | 12/2020 | |
| CN | 215572721 | U | | 1/2022 | |
| CN | 215867127 | U | | 2/2022 | |
| CN | 221326751 | U | | 7/2024 | |
| CN | 221425522 | U | | 7/2024 | |
| JP | 2011007607 | A | | 1/2011 | |

* cited by examiner

P400

TAPE MEASURE, MEASURING DEVICE, AND MEASURING METHOD

RELATED APPLICATIONS

This application is a continuation application of PCT Application No. PCT/CN2023/141877, filed on Dec. 26, 2023; PCT/CN2023/141877 claimed the benefit of priority of the following Chinese Application Numbers filed on Nov. 10, 2023: CN 202311506968.7, CN 202311500390.4, CN 202311500213.6, CN 202311498172.1 and CN 202311502442.1, and the contents of the foregoing documents are incorporated herein by reference in entirety.

TECHNICAL FIELD

The present disclosure relates to the field of measurement, and in particular, to a tape measure, a measuring device, and a measuring method.

BACKGROUND

With the development of science and technology, length measuring tools have been widely used in work and life, and increasingly high requirements have been posed on the accuracy of measurement. A traditional tape measure may realize ranging by identifying printed graduations on a tape with naked eyes. Due to different eyesight and reading habits of different people, the accuracy of measurement is low and the consistency of data is poor. A tape measure in the prior art is provided with a sensor to read an identification code printed on a tape, thus realizing length reading. Since the identification code needs to be printed, the accuracy of the printing technique is low, which will result in low accuracy of measurement.

Therefore, there is a need to provide a novel tape measure, a measuring device, and a measuring method, so as to improve the accuracy of measurement.

The content in the background section is merely information known to the inventors, and neither represents that the above information has been found in the public field prior to the filing date of the present disclosure nor represents that it can become the prior art of the present disclosure.

SUMMARY

The present disclosure provides a tape measure, a measuring device, and a measuring method that can improve the accuracy of measurement.

In a first aspect, the present disclosure provides a tape measure, including: a first shell having a first outlet; a tape including one end mounted in the first shell and another end extending out of the first shell through the first outlet and configuted to move in a first measuring direction relative to the first shell; and an optical positioning assembly connected to the first shell and including: an imaging sensor mounted in the first shell opposite to a surface of the tape, and configured to, when working, consecutively acquire images of the tape in a moving process and perform feature comparison on the images to determine a relative displacement of the tape moving in the first measuring direction in real time, and a first controller in communication with the imaging sensor and configured to, when working, receive the relative displacement and determine in real time, based on the relative displacement, a length by which the tape extends out of the first shell.

In a second aspect, the present disclosure provides a measuring device including: a tape measure, including: a first shell having a first outlet, a tape including one end mounted in the first shell and another end extending out of the first shell through the first outlet and configured to move in a first measuring direction relative to the first shell, and an optical positioning assembly connected to the first shell and including: an imaging sensor mounted in the first shell opposite to a surface of the tape, and configured to, when working, consecutively acquire images of the tape in a moving process and perform feature comparison on the images to determine a relative displacement of the tape moving in the first measuring direction in real time, and a first controller in communication with the imaging sensor and configured to, when working, receive the relative displacement and determine in real time, based on the relative displacement, a length by which the tape extends out of the first shell; and a laser ranging device connected to the tape measure, including a second shell provided with a second outlet, and a laser measuring portion disposed in the second shell and configured to, when working, measure a distance in a second measuring direction via the second outlet. a distance in a second measuring direction through the second outlet.

In a third aspect, the present disclosure provides a measuring method for a tape measure provided in the first aspect and including: consecutively acquiring, by the imaging sensor, the images of the tape in the moving process, and performing feature comparison on the images to determine a relative displacement of the tape moving in the first measuring direction in real time; and receiving, by the first controller, the relative displacement, and determining in real time, based on the relative displacement, a length by which the tape extends out of the first shell.

To sum up, the tape measure, the measuring device, and the measuring method provided in the present disclosure can consecutively acquire, by the imaging sensor, the images of the tape in the moving process, and perform feature comparison on the consecutively acquired images to determine a relative displacement of the tape moving in the first measuring direction in real time, and then calculate, by the first controller, a length by which the tape extends out of the first shell, thus achieving the purpose of ranging. The imaging sensor in the tape measure provided in the present disclosure can contrast a same feature in adjacent images to determine a relative displacement corresponding to the adjacent images, and then the controller can calculate a moving distance of the tape in real time without reading the printed marks on the tape. Thus, the accuracy of measurement is improved.

Other functions of the tape measure, the measuring device, and the measuring method provided in the present disclosure will be enumerated in part in the following description. According to the description, the contents presented by reference numerals and examples will be apparent for those of ordinary skill in the art. Creative aspects of the tape measure, the measuring device, and the measuring method provided in the present disclosure provided in the present disclosure may be fully explained by practice or by using the methods, devices, and combinations described in the following detailed examples.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION

Figure 1:
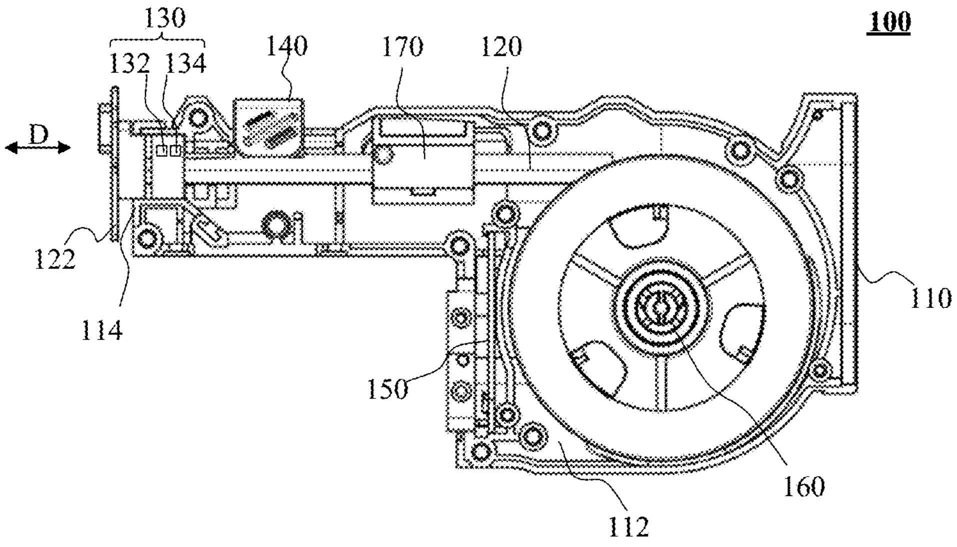
FIG. 1 is a structural schematic diagram of a tape measure provided according to some exemplary embodiments of the present disclosure.

The following description provides specific application scenarios and requirements of the present disclosure, with the purpose of enabling those skilled in the art to make and use the content in the present disclosure. For those skilled in the art, various partial modifications to the disclosed embodiments are obvious, and without departing from the spirit and scope of the present disclosure, the general principles defined herein can be applied to other embodiments and application. Therefore, the specification is not limited to the embodiments, but is the consistent with the widest scope of claims.

The terms used herein are merely intended to describe specific examples or embodiments, rather than to limit the present disclosure. For example, unless expressly stated otherwise, the singular forms "a", "an" and "this" used herein may also include plural forms. In the present disclosure, the terms "include" and/or "comprise" refer to the existence of an associated integer, step, operation, element, component and/or group, without excluding the existence of one or more other features, integers, steps, operations, elements, components and/or groups. In other words, other features, integers, steps, operations, elements, components and/or groups may be added to the system/method.

It should be understood that in the description of the present disclosure, orientations or positional relationships indicated by terms such as "above", "below", "left", "right", "front", "rear", "top", "bottom", "inside", "outside", "vertical", "horizontal", "transverse", "longitudinal" are all based on what are illustrated in the drawings. These terms are mainly intended to better describe the present disclosure and embodiments thereof, rather than to define that the devices or components indicated must have the specific orientation or be constructed and operated in the specific orientation.

Besides, some of the terms mentioned above may be used to indicate other meanings in addition to indicating the orientation or positional relations. For example, the term "upper" may also be used to indicate an attachment relationship or a connection relationship in some cases. Those of ordinary skill in the art may understand specific meanings of these terms in the present disclosure based on a specific situation.

In addition, the meanings of the terms "mount", "dispose", and "connect" should be understood in a board sense. For example, "connection" may be a fixed connection, a removable connection, or integration; may be a mechanical connection or an electrical connection; may be a direct connection or an indirect connection implemented by using an intermediate medium; or may be intercommunication between two components, elements or components. Those of ordinary skill in the art may understand specific meanings of the foregoing terms in the present disclosure based on a specific situation.

In the present disclosure, "X includes at least one of A, B, or C" means X includes at least A, X includes at least B, or X includes at least C. In other words, X may include any combination of A, B, and C, or include any combination of A, B, and C and other possible content/element. The any combination of A, B, and C may be A, B, C, AB, AC, BC, or ABC.

In the present disclosure, unless otherwise explicitly specified, an association relationship between structures may be a direct association relationship or an indirect association relationship. For example, for the description "A is connected to B", unless it is explicitly described that A is directly connected to B, it will be construed as that A may be directly connected to B or indirectly connected to B. For another example, for the description "A is over B", unless it is explicitly described that A is directly above B (A and B are adjacent and A is above B), it will be construed as that A may be directly above B, or A may be indirectly over B (A and B are spaced apart by other element and A is above B), and so on.

In consideration of the following description, in the present disclosure, these and other features, the operations and functions of related elements of the structure, as well as the economic efficiency of the combination and manufacturing of components can be significantly improved. With reference to the drawings, all of these form part of the present disclosure. However, it should be clearly understood that the drawings are merely intended for illustration and description purposes, rather than to limit the scope of the present disclosure. It should be understood that the accompanying drawings are not drawn to scale.

FIG. 1 is a structural schematic diagram of a tape measure provided according to some exemplary embodiments of the present disclosure. With reference to FIG. 1, a tape measure 100 provided herein may include: a first shell 110, a tape 120, an optical positioning assembly 130, and a first controller 150. In some embodiments, the tape measure 100 may further include a brake assembly 140. In some embodiments, the tape measure 100 may further include a tape retracting assembly 160. In some embodiments, the tape measure 100 may further include a guiding assembly 170. In some embodiments, the tape measure 100 may further include an output assembly (not shown in FIG. 1).

The tape 120 may be mounted in the first shell 110 and can be pulled out or retract relative to the first shell 110 to move in a target direction relative to the first shell 110, thereby measuring a length. The direction indicated by the arrow in FIG. 1 is the target direction D. The target direction D may be a measuring direction of the tape measure 100. For ease of distinguishing, we define the measuring direction of the tape measure 100 as a first measuring direction. The optical positioning assembly 130 may be mounted in the first shell

110 and can measure a relative displacement of the tape 120 moving in the target direction D relative to the first shell 110. The first controller 150 may calculate, based on the relative displacement, a length by which the tape 120 is pulled out of the first shell 110.

With reference to FIG. 1, the first shell 110 may be a mounting base of the tape measure 100. Other parts (such as the tape 120, the optical positioning assembly 130, the brake assembly 140, the first controller 150, the tape retracting assembly 160, and the output assembly) of the tape measure 100 may be mounted with the first shell 110 as a carrier. The first shell 110 may include an accommodating cavity 112 in which other parts can be mounted. The first shell 110 may be provided with a first outlet 114. The tape 120 may be pulled out of or retract into the first shell 110 through the first outlet 114. In some embodiments, the first outlet 114 may extend in the target direction D and thus may maintain the extension and retraction of the tape 120 in the target direction D.

The tape 120 may be a portion of the tape measure 100 that is configured to measure a length. One end of the tape 120 may be mounted in the first shell 110, e.g., in the accommodating cavity 112. The other end of the tape 120 may extend out of the first shell 110 through the first outlet 114 and can move in the target direction D relative to the first shell 110. In some embodiments, a limiting lug 122 is provided at an end of the tape 120 that passes through the first outlet 114. When the tape 120 retracts into the first shell 110, the limiting lug 122 presses against the first outlet 114 of the first shell 110 to prevent the tape 120 from completely going into the first shell 110. In some embodiments, an accessory structure connected to the tape 120 and moving along with the tape 120 may also be regarded as a portion of the tape 120.

In some embodiments, the tape measure 100 may further include the tape retracting assembly 160. The tape retracting assembly 160 may be rotationally mounted in the accommodating cavity 112. The tape retracting assembly 160 is capable of rotating relative to the first shell 110. The end, mounted in the first shell 110, of the tape 120 may be connected to the tape retracting assembly 160 and wound around the tape retracting assembly 160. When the tape 120 is pulled out of the first shell 110, the tape retracting assembly 160 rotates forward to release the tape 120 wound around the tape retracting assembly 160, so that the tape 120 can be pulled out. When the tape 120 retracts into the first shell 110, the tape retracting assembly 160 rotates reversely to wind the tape 120 around the tape retracting assembly 160, so that the tape 120 is retracted.

In some embodiments, the tape measure 100 may further include the guiding assembly 170. The guiding assembly 170 may be mounted in the accommodating cavity 112. The guiding assembly 170 may include a guiding slot extending in the target direction D. The end, extending out of the first shell 110, of the tape 120 may extend out of the first outlet 114 of the first shell 110 after passing through the guiding slot such that a moving direction when the tape 120 is pulled out or retracts into the first shell 110 is the target direction D.

The optical positioning assembly 130 is mechanically connected to the first shell 110. The optical positioning assembly 130 may be mounted in the accommodating cavity 112. The optical positioning assembly 130 may be configured to read a length by which the tape 120 extends out of the first shell 110. The optical positioning assembly 130 may include an imaging sensor 132. The imaging sensor 132 may be mounted in the first shell 110, e.g., in the accommodating cavity 112. The imaging sensor 132 may be disposed opposite to a surface of the tape 120. During working, images of the tape 120 in the moving process are acquired consecutively, and feature comparison is performed on the images to determine the relative displacement of the tape 120 moving in the target direction D in real time. In some embodiments, a mounting position of the imaging sensor 132 may be a position disposed relative to linear movement of the tape 120 in the target direction D. That is, the movement of the tape 120 within an image acquisition range of the imaging sensor 132 is linear movement in the target direction D. In this case, images of the tape 120 acquired by the imaging sensor 132 are images of the tape 120 in the process of moving in the target direction D. Therefore, the imaging sensor 132 determines different pixel positions corresponding to a same feature of the tape 120 in captured adjacent images by performing feature comparison on the adjacent images, thus determining a relative displacement of the tape 120 when moving in the target direction D in real time, in order to guarantee the accuracy of relative displacement calculation. For example, the imaging sensor 132 may be mounted at any position between the first outlet 114 and the guiding assembly 170. For example, the imaging sensor 132 may be mounted at the outlet 114. For example, the imaging sensor 132 may be mounted at the guiding assembly 170. In some other embodiments, the mounting position of the imaging sensor 132 may be a position disposed relative to nonlinear movement of the tape 120. For example, the imaging sensor 132 is disposed opposite to the wound portion of the tape 120 in FIG. 1. That is, the movement of the tape 120 within the image acquisition range of the imaging sensor 132 is rotation around an axis. In this case, the images of the tape 120 acquired by the imaging sensor 132 are images of the tape 120 in the process of rotating around the axis.

In some embodiments, the tape measure 100 may further include a first spacing piece. The first spacing piece may be disposed in the accommodating cavity 112. The first spacing piece is configured to adjust a distance between the imaging sensor 132 and the tape 120. When the imaging sensor 132 works, the first spacing piece may maintain the distance between the imaging sensor 132 and the tape 120 in a first working range. In the event that the distance between the imaging sensor 132 and the tape 120 is in the first working range, the imaging sensor 132 is capable of working normally.

The optical positioning assembly 130 may further include a position identification sensor 134. The position identification sensor 134 may be mounted in the first shell 110, e.g., in the accommodating cavity 112. The position identification sensor 134 may be disposed opposite to a surface of the tape 120 to read, when working, a position identifier (as will be described below in detail with respect to FIG. 5) provided on the tape 120, thus determining an actual extension length of the tape 120 corresponding to the read position identifier so as to correct the relative displacement determined by the imaging sensor 132. In some embodiments, a mounting position of the position identification sensor 134 may be a position disposed relative to linear movement of the tape 120 in the target direction D. The movement of the tape 120 within an identification range of the position identification sensor 134 is linear movement in the target direction D. Therefore, when passing by the position identification sensor 134, the tape 120 is moving in the target direction D. The position identification sensor 134 determines an absolute length by which the tape 120 extends out of the first shell 110 in the target direction D by identifying a position identifier provided on the tape 120. For example, if the position identification sensor 134 identifies the position identifier of the tape 120 at 10 cm, it may determine that the absolute length by which the tape 120 extends out of the first shell 110 in the target direction D is 10 cm. The position identification sensor 134 may be mounted at any position between the first outlet 114 and the guiding assembly 170. The mounting position of the position identification sensor 134 may also be a position disposed relative to rotation of the tape 120 around an axis. The movement of the tape 120 within the identification range of the position identification sensor 134 is rotation around the axis. Therefore, when passing by the position identification sensor 134, the tape 120 is rotating around the axis. The imaging sensor 132 and the position identification sensor 134 may be disposed on a same side or different sides of the tape 120.

In some embodiments, the tape measure 100 may further include a second spacing piece. The second spacing piece may be mounted in the accommodating cavity 112. The second spacing piece is configured to adjust a distance between the position identification sensor 134 and the tape 120. When the position identification sensor 134 works, the second spacing piece may maintain the distance between the position identification sensor 134 and the tape 120 in a second working range. In the event that the distance between the position identification sensor 134 and the tape 120 is in the second working range, the position identification sensor 134 is capable of working normally.

It will be understood that the position identification sensor 134 and the imaging sensor 132 are disposed on the same side of the tape 120, and when a required spacing between the position identification sensor 134 and the tape 120 is identical or close to a required spacing between the imaging sensor 132 and the tape 120, the position identification sensor 134 and the imaging sensor 132 may share one spacing piece to save the space in the first shell 110.

With reference to FIG. 1, the first controller 150 may be mounted in the accommodating cavity 112. The first controller 150 may be in communication with the optical positioning assembly 130 to exchange data with the optical positioning assembly 130. For example, the first controller 150 may be in communication with the imaging sensor 132 and is capable of receiving the relative displacement of the tape 120 moving in the target direction D that is transmitted by the imaging sensor 132 so as to calculate a length by which the tape 120 extends out of the first shell 110 according to the relative displacement, thus realizing digital measurement. There is no limitation on the type of the first controller 150 herein. The first controller 150 may include: a single chip, a Central Processing Unit (CPU), a Graphics Processing Unit (GPU), a Physics Processing Unit (PPU), a Digital Signal Processor (DSP), a Field Programmable Gate Array (FPGA), a Programmable Logic Device (PLD), a microcontroller, a microprocessor, a Reduced InstrucTIon Set Computer (RISC), and advanced RISC machine (ARM), and an Application Specific Integrated Circuit (ASIC). That is, the first controller 150 is any circuit or processor capable of executing one or more functions, or any combination thereof.

Figure 2:
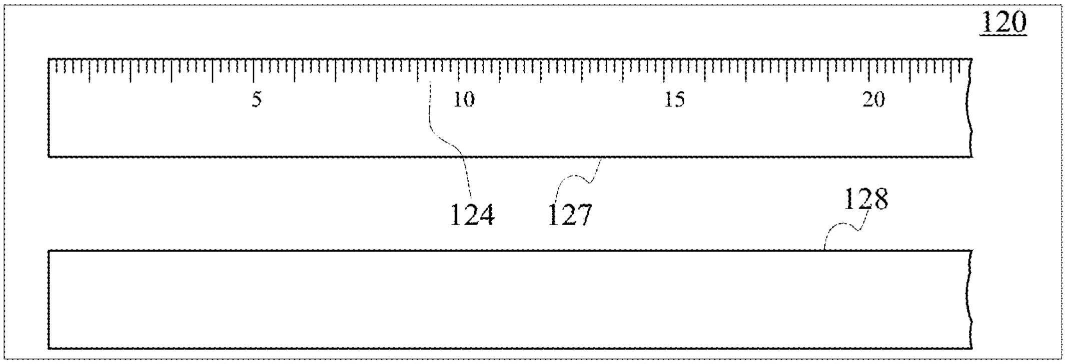
FIG. 2 is a structural schematic diagram of a tape provided according to some exemplary embodiments of the present disclosure.

FIG. 2 is a structural schematic diagram of a tape 120 provided according to some exemplary embodiments of the present disclosure. With reference to FIG. 2, the tape 120 may include two surfaces 127 and 128. For ease of description, we define the surface opposite to the imaging sensor 132 as a first side 127 and the other surface as a second side 128. As shown in FIG. 2, both of the first side 127 and the second side 128 may be not provided with any printed identifier. It will be understood that to facilitate viewing by a user, graduations 124 may be printed on a surface of the tape 120. As described above, the imaging sensor 132 may determine different pixel positions corresponding to the same feature of the tape 120 in adjacent images by performing feature comparison on the images, thus determining the relative displacement of the tape 120 when moving in the target direction D in real time. Therefore, to enable the imaging sensor 132 to acquire a feature on the first side 127 of the tape 120, the surface roughness of the first side 127 may be within the identification range of the imaging sensor 132. The surface roughness of the first side 127 being within the identification range of the imaging sensor 132 may be that a feature formed by the surface roughness of the first side 127 may be within the identification range of the imaging sensor 132. For example, the above function may be realized by controlling the surface roughness of the first side 127 when the tape 120 is manufactured. For example, the surface of the first side 127 may be coated with a nylon membrane to improve the roughness thereof, thus realizing the above function. Specifically, in the moving process of the tape 120, bright zones (i.e., peaks) and dark zones (i.e., backs of peaks and valleys) may occur due to a micro concave-convex portion of the surface of the rough tape 120, thus producing a nonuniform two-dimensional brightness distribution. The above nonuniform two-dimensional brightness distribution produced by the first side 127 of the tape 120 is beneficial for feature comparison by the imaging sensor 132, thus being conducive to improving the accuracy of measurement.

Figure 3:
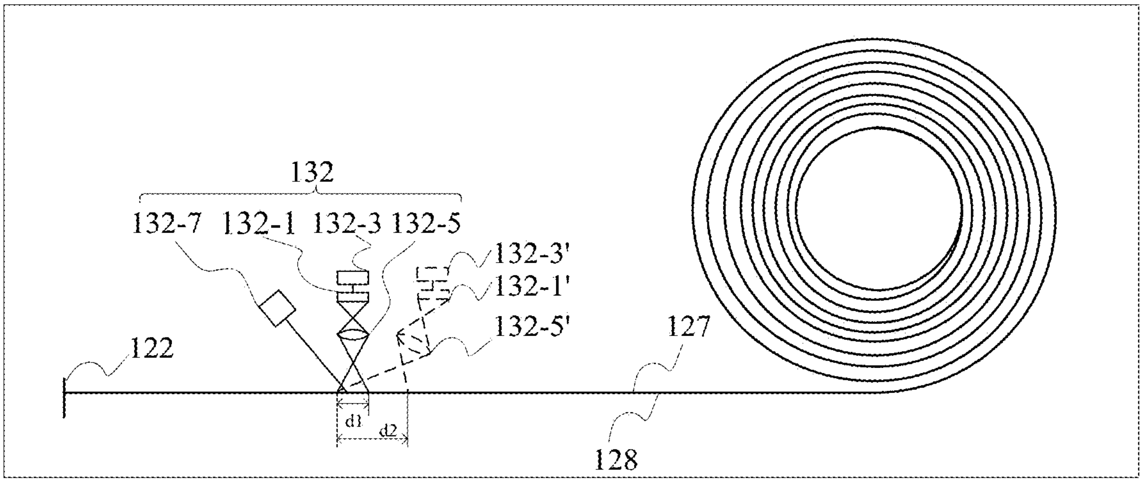
FIG. 3 is a structural schematic diagram illustrating a relative position relationship of an imaging sensor and a tape provided according to some exemplary embodiments of the present disclosure.

FIG. 3 is a structural schematic diagram illustrating a relative position relationship of an imaging sensor 132 and a tape 120 provided in some exemplary embodiments of the present disclosure. With reference to FIG. 3, the imaging sensor 132 may include an imaging component 132-1 and an image processing circuit 132-3. As shown in FIG. 3, in some embodiments, the imaging sensor 132 may further include a receiving lens 132-5. In some embodiments, the imaging sensor 132 may further include a light source 132-7.

The imaging component 132-1 may be an image acquisition device to acquire the images of the tape 120 in the moving process during working. The imaging component 132-1 is capable of capturing images at a preset frequency to consecutively acquire the images of the tape 120 in the moving process. The preset frequency may allow the images acquired by the imaging sensor 132 at adjacent time points to be superposed at least in part so that the imaging sensor 132 calculates a relative displacement of the tape 120 moving between the adjacent images according to the superposed portion in the adjacent images. For example, no matter whether the tape 120 is pulled out at a high speed or a low speed, a feature which is superposed at least in part exists in the adjacent images acquired by the imaging component 132-1 and the imaging sensor 132 may calculate the relative displacement of the tape 120. In some embodiments, the preset frequency at which the imaging component 132-1 acquires images may be determined based on a speed range at which the tape 120 is pulled out or retracts. The speed range at which the tape 120 is pulled out or retracts may be obtained in a plurality of ways, such as an empirical way, a statistical way, an experimental way, and a machine learning way, or any composition thereof. In some embodiments, the preset frequency may be a fixed value. For example, a preset image capturing frequency is not lower than 2000 frames per second (FPS). In some embodiments, the preset frequency may vary in a certain value range. For example, the preset frequency may be adjusted adaptively in the value range according to the roughness of images captured. For example, the value range is [1000 FPS, 5000 FPS], and when a moving speed of the tape 120 is small, the value of the preset frequency is close to the capturing frequency of 1000 FPS. When the moving speed of the tape 120 is large, the value of the preset frequency is close to the capturing frequency of 5000 FPS. That is to say, the value of the preset frequency is in the value range and is positively related the moving speed of the tape 120, and by adaptively adjusting the capturing frequency, the efficiency of measurement may be improved on the premise of guaranteeing the accuracy of measurement. Thus, the imaging component 132-1 is capable of performing capturing at the capturing frequency to consecutively acquire the images of the tape 120 in the moving process. The imaging component 132-1 may be any form of device capable of image acquisition, e.g., may be a micro Complementary Metal Oxide Semiconductor (CMOS) camera. The imaging component 132-1 may also be other device for fast photographing in the art, which will not be limited herein.

The image processing circuit 132-3 may be in communication with the imaging component 132-1 to receive the images acquired by the imaging component 132-1. Further, the image processing circuit 132-3 may perform feature comparison on the received images to determine the relative displacement of the tape 120 moving in the target direction D in real time. The first controller 150 and/or the image processing circuit 132-3 may control the capturing frequency of the imaging component 132-1 and control starting of image acquisition and stopping of image acquisition.

With reference to FIG. 3, the receiving lens 132-5 is disposed between the imaging component 132-1 and the tape 120. The imaging component 132-1 may be located in an imaging plane of the receiving lens 132-5 for the tape 120. The receiving lens 132-5 may converge light reflected off the tape 120 to the imaging component 132-1, thus improving the efficiency of measurement. The receiving lens 132-5 projects the nonuniform two-dimensional brightness distribution of the tape 120, and then the imaging component 132-1 captures images so that the images of the tape 120 in the moving process can be acquired consecutively.

With reference to FIG. 3, the lamp source 132-7 may be disposed on a side where the first side 127 of the tape 120 is located to emit light to the tape 120. When the light source 132-7 obliquely irradiates on the first side 127 of the tape 120, it is more beneficial to produce the nonuniform two-dimensional brightness distribution. Thus, the light source 132-7 is provided for use in cooperation with the imaging component 132-1, thus being conducive to improving the feature comparison precision and ultimately conducive to improving the accuracy of measurement.

The imaging component 132-1 may directly face the first side 127 of the tape 120. In this case, the imaging component 132-1 has a higher uniformity of field of view such that the imaging sensor 132 occupies a small volume in the shell of the tape measure 100. The imaging component 132-1 may obliquely face the first side 127 of the tape 120, e.g., an imaging component 132-1' and a receiving lens 132-5'. In this case, the imaging component 132-1' is in a direction where reflected light is strongest and has high surface adaptability. Compared with the capturing area (with a diameter of d1) of the imaging component 132-1 that directly faces the first side 127, the capturing area (with a diameter of d2) of the imaging component 132-1' that obliquely faces the first side 127 is larger, thus being conducive to improving the efficiency of measurement. It will be understood that the imaging sensor 132 may be set according to actual requirements in practical use, which will not be limited in the embodiments of the present disclosure.

Figure 4:
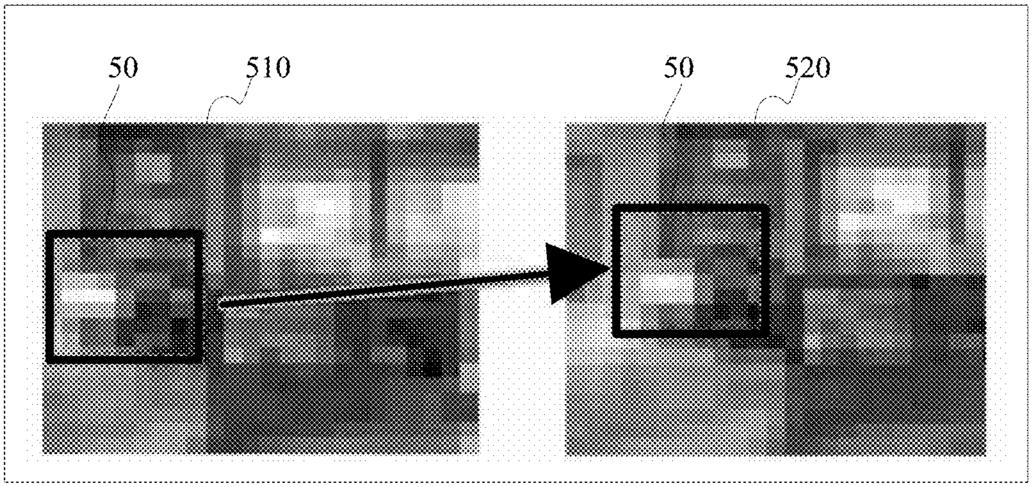
FIG. 4 is a schematic diagram illustrating images captured by an imaging sensor provided according to some exemplary embodiments of the present disclosure.

FIG. 4 is a schematic diagram illustrating images captured by an imaging sensor 132 provided according to some exemplary embodiments of the present disclosure. With reference to FIG. 4, an image 510 and an image 520 are images acquired at adjacent time points. An acquisition timestamp of the image 510 is larger than that of the image 520. Each of the image 510 and the image 520 contains a target feature point 50 of a same feature. In other words, the image 510 and the image 520 are superposed at least in part at the target feature points 50. The target feature points may be a set of pixels. For example, the image 520 is regarded as a current image and the image 510 as a previous image to the current image. The imaging component 132-1 captures the image 520 and then transmits it to the image processing circuit 132-3, and the image processing circuit 132-3 processes the image 520 and the image 510 by a spatial cross-correlation algorithm. Specifically, the image processing circuit 132-3 performs feature comparison on the image 520 and the image 510, and the spatial cross-correlation algorithm is carried out to determine positions of a maximum value (Xi, Yi) of a cross correlation coefficient in two images, i.e., determine respective coordinates of the target feature points 50 of the same feature of the two images in the two images. For example, a first position of (Xi, Yi) in the image 510 and a second position of (Xi, Yi) in the image 520 are determined. A two-dimensional displacement (ΔXi, ΔYi) of (Xi, Yi) between the two images is further determined. For example, assuming that the moving direction (i.e., the target direction D) of the tape 120 is the Y-axis direction, ΔYi may be determined as a relative displacement of the image 520 in the target direction D relative to the previous image 510.

It needs to be noted that the relative displacement is a vector. Assuming that the target direction D in which the tape 120 extends out of the first shell 110 is positive and a direction in which the tape 120 retracts into the first shell 110 is negative, the relative displacement is a positive value in the event that the image 520 corresponding to the tape 120 extends out of the first shell 110 relative to the image 510. The relative displacement is a negative value in the event that the image 520 corresponds to the tape 120 retracting into the first shell 110 relative to the image 510. It will be understood that since the imaging component 132-1 captures images at a high frequency, the image processing circuit 132-3 determines the relative displacement also at a high displacement, thus guaranteeing the instantaneity of determining the relative displacement.

Each time after the image processing circuit 132-3 determines the relative displacement of the current image relative to the previous image, the relative displacement is transmitted to the first controller 150 such that the first controller 150 determines a length by which the tape 120 extends out of the first shell 110 in the target direction D in real time based on the received relative displacement.

A state in which the limiting lug 122 of the tape 120 presses against the first outlet 114 of the first shell 110 may be designated as an initial state of the tape measure 100, and the tape 120 being pulled out (i.e., a state in which the limiting lug 122 of the tape does not press against the first outlet 114) may be designated as a working state of the tape measure 100. In response to the tape measure 100 changing from the initial state to the working state, the first controller 150 controls the imaging sensor 132 to start working.

The image processing circuit 132-3 may be connected to the first controller 150 through a serial port. Thus, the image processing circuit 132-3 transmits the relative displacement calculated in the above embodiment to the first controller 150 such that the first controller 150 determines a length by which the tape 120 extends out of the first shell 110 in the target direction D in real time. In some embodiments, the image processing circuit 132-3 may determine a relative displacement corresponding to each image and then successively transmits it to the first controller 150 to guarantee that the first controller 150 determines an extension length of the tape 120 in real time and outputs a measurement reading in real time. In some embodiments, to reduce the number of times of information interaction, after contiguously determining relative displacements corresponding to N (an integer greater than 1) images, the image processing circuit 132-3 may also transmit the relative displacement corresponding to the Nth image to the first controller 150. In other words, the relative displacement is reported to the first controller 150 at intervals of N−1 images. For example, after contiguously determining the relative displacements corresponding to 5 images, the image processing circuit 132-3 transmits the relative displacement corresponding to the fifth image to the first controller 150, rather than transmits all the relative displacements respectively corresponding to the first to fifth images to the first controller 150 successively. Herein, due to a high capturing frequency of the imaging component 132-1, it can also be effectively ensured in this embodiment that the first controller 150 can guarantee the instantaneity of determining the extension length of the tape 120 and can also reduce the number of times of information interaction, thereby reducing the power consumption of the tape measure 100.

After receiving the relative displacement corresponding to the current image, the first controller 150 adds the relative displacement corresponding to the current image with a relative length corresponding to the previous image to obtain a relative length corresponding to the current image. The relative length corresponding to the current image is a displacement of the tape 120 relative to the first outlet 114 in the target direction D that is calculated by the first controller 150, starting from the first controller 150 controlling the imaging sensor 132 to start working to a time point when the current image is acquired. For example, in the event that the image 520 corresponds to the tape 120 extending out of the first shell 110 relative to the image 510, if the relative displacement corresponding to the image 520 is positive value 0.110 and the relative length corresponding to the image 510 is 50 cm, the relative length corresponding to the image 520 is 50.110 cm. In the event that the image 520 corresponds to the tape 120 retracting into the first shell 110 relative to the image 510, if the relative displacement corresponding to the image 520 is negative value −0.101 and the relative length corresponding to the image 510 is 50 cm, the relative length corresponding to the image 520 is 48.999 cm.

In some embodiments, the limiting lug 122 has a thickness. The thickness of the limiting lug may affect the accuracy of measurement. Here, the thickness of the limiting lug 122 is denoted as an "initial length". During measurement, the relative length determined by the first controller 150 is added with the thickness of the limiting lug 122 (i.e., the initial length) to obtain measurement data with an accurately tested value.

In some other embodiments, the tape measure 100 may have a manufacturing error. One case is that after the tape 120 moves a distance (denoted as an initial length), the first controller 150 controls the imaging sensor 132 to start measuring. That is, the limiting lug 122 of the tape 120 arrives at a measurement starting point after moving the initial length. In this case, the initial length is a negative value. Therefore, a length by which the tape 120 extends out of the first shell 110 can be determined accurately only after the relative length determined by the first controller 150 is added with the negative value. Another case is that the tape 120 does not move and already has a certain extension length (denoted as an initial length). In this case, the initial length is a positive value, a length by which the tape 120 extends out of the first shell 110 can be determined accurately only after the relative length determined by the first controller 150 is added with the positive value. For the manufacturing error of the tape measure 100, after calculating the relative length corresponding to the current image based on the relative displacement transmitted by the imaging sensor 132, the first controller 150 adds the pre-stored initial length by which the tape 120 extends out of the first shell 110 with the relative length in real time to obtain the length by which the tape 120 extends out of the first shell 110 in real time.

To further improve the accuracy of measurement, some exemplary embodiments of the present disclosure further provide a tape measure 100 with a correction function. With reference to the tape 120 shown in FIG. 5A to FIG. 5C, the tape measure 100 is provided with corresponding position identifiers 126 at a plurality of preset positions on a surface of the tape 120 on the one hand, and on the other hand, the position identifier 126 is read by the position identification sensor 134, thereby determining the position of the read position identifier 126 at the tape 120 as an absolute length. The absolute length may be used for correcting an error in the process of calculating an extension length of the tape 120 from the relative displacement determined by the imaging sensor 132.

Figure 5A:
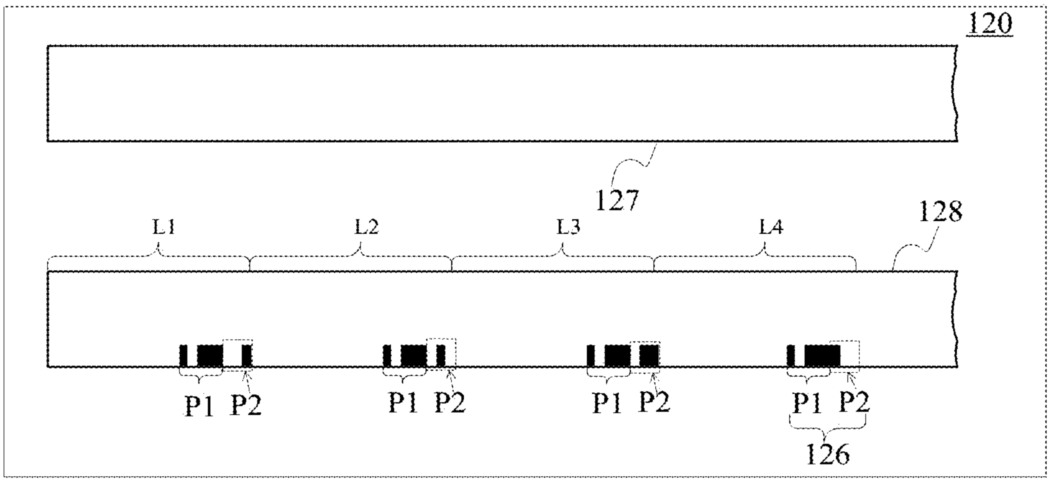
FIG. 5A is another structural schematic diagram of a tape provided according to some exemplary embodiments of the present disclosure.
Figure 5B:
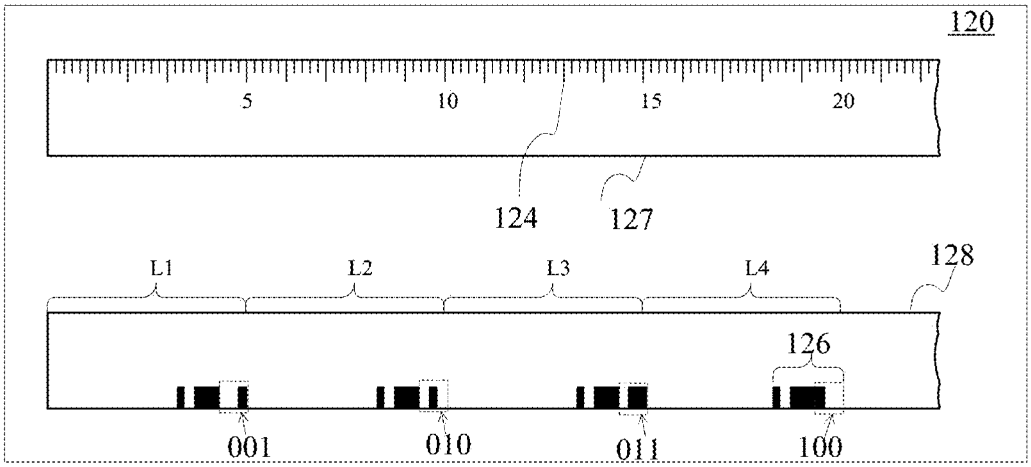
FIG. 5B is a further another structural schematic diagram of a tape provided according to some exemplary embodiments of the present disclosure.
Figure 5C:
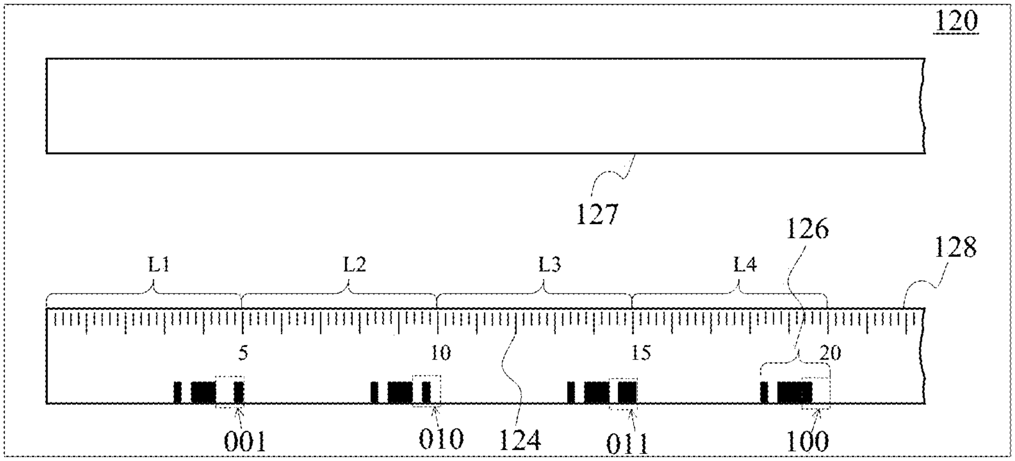
FIG. 5C is a structural schematic diagram of a tape provided according to some exemplary embodiments of the present disclosure.

All the position identifiers 126 are provided on a same side of the tape 120, e.g., on the first side 127 or the second side 128. Furthermore, in some embodiments, the position identifiers 126 may be on a same side of the tape with the graduations 124 for reading by naked eyes, as shown in FIG. 5C. In some embodiments, the position identifiers 126 may also be provided on a different side of the tape from the graduations 124 for reading by naked eyes, as shown in FIG. 5B. In the event that the position identifiers 126 and the graduations 124 are provided on different sides, it is conducive to reducing the difficulty of printing and beneficial for reducing the defective percentage.

Specifically, the position identifiers 126 at different positions may be different. Each position identifier 126 is in one-to-one correspondence with an actual extension length of the tape 120, and the one-to-one correspondence is pre-stored in a storage unit of the tape measure 100.

In some embodiments, M (a value of M is a positive integer) position identifiers 126 divide the tape 120 into M+1 segments, and a distance of each segment may be identical. For example, L1, L2 . . . are each 5 cm in FIG. 5A. That is, the end position of the first position identifier 126 corresponds to the tape extending out by 5 cm, the end position of the second position identifier 126 corresponds to the tape extending out by 10 cm, and so on. In some embodiments, the distance of each segment may also be different. For example, the end position of the first position identifier 126 corresponds to the tape extending out by 3 cm, the end position of the second position identifier 126 corresponds to the tape extending out by 7 cm, the end position of the third position identifier 126 corresponds to the tape extending out by 12 cm, and so on. In some embodiments, some segments of the M+1 segments may be the same in distance, while some segments may be different in distance. In the embodiments of the present disclosure, with the position identifiers 126, an error caused by the imaging sensor 132 may only occur in a segment between adjacent position identifiers 126 without being accumulated to next segment. For example, the error caused by the imaging sensor 132 in 0-5 cm (segment L1) only occurs in a range with a measured length being in 0-5 cm (segment L1). After the position identifier 126 at 5 cm is read, the error will be reset to zero and thus is not accumulated to a range with a measured length being 5-10 cm (segment L2). In some embodiments, the position identifier 126 may be composed of a stripe code detectable in both pulling-out and retraction directions of the tape. A coding mode of the position identifier 126 may be one well known in the art and capable of meeting the requirement, e.g., interleaved 2 of 5 bar code, or may be defined as needed. For example, in the embodiment shown in FIG. 5A to FIG. 5C, binary coding is adopted for the position identifier 126. Specifically, with reference to FIG. 5A to FIG. 5C, each position code 126 includes a flag bit P1 and a data bit P2, where binary coding is adopted for the data bit P2. In the process of the tape 120 being pulled out of the first shell 110, the flag bit P1 and the data bit P2 of each position identifier 126 are read successively. The flag bit P1 serves as a start bit and the data bit P2 is read forward (if the binary of the data bit P2 is 001, "0", "0", and "1" are read forward in this order, and "1", "0", and "0" are read reversely in this order). Thus, an absolute length by which the tape 120 extends out currently can be determined based on the binary corresponding to the data bit P2 of each position identifier 126. If the binary of the data bit P2 is 001, the absolute length stored in association therewith is 5 cm. In the process of the tape 120 retracting into the first shell 110, the data bit P2 and the flag bit P1 of each position identifier 126 are read successively. The flag bit P1 serves as an end bit and the data bit P2 is read reversely. Thus, an absolute length by which the tape extends out currently can be determined based on the binary corresponding to the data bit of each position identifier 126. If "1", "0", and "0" are read reversely in this order, the data bit P2 can be determined as binary 001, and the absolute length stored in association therewith can be further determined as 5 cm.

The position identification sensor 134 is disposed opposite to a side, on which the position identifiers 126 are provided, of the tape 120. For example, in the event that the tape 120 is as shown in FIG. 5A and FIG. 5B, the position identification sensor 134 is disposed opposite to the second side 128 of the tape 120. In the event that the tape 120 is as shown in FIG. 5C, the position identification sensor 134 is disposed opposite to the first side 127 of the tape 120. In some embodiments, the position identification sensor 134 may be a photoelectric sensor. The reflectivity of a gap between dark stripes in each position identifier 126 is different from that of the dark stripes. Thus, the photoelectric sensor may identify the flag bit P1 and the data bit P2 according to different reflectivity at the position identifier 126, and may determine the binary corresponding to the data bit P2. Thus, an absolute position signal corresponding to the current position identifier 126 may be generated according to the binary. In some embodiments, the position identification sensor 134 may be a hall sensor, and the magnetism of the dark stripes of the position identifier 126 is different from that of the gap. Thus, the hall sensor may identify the flag bit P1 and the data bit P2 according to different magnetism at the position identifier 126, and may determine the binary corresponding to the data bit P2. Thus, an absolute position signal corresponding to the current position identifier 126 may be generated according to the binary. In the moving process of the tape 120, the position identification sensor 134, in response to reading a target position identifier 126, generates the absolute position signal corresponding to the target position identifier 126 according to a precedence relationship of reading the flag bit P1 and the data bit P2 and the data bit P2 in the target position identifier 126. If the position identification sensor 134 successively reads the flag bit P1 and the data bit P2 in the target position identifier 126, it indicates that the tape 120 is currently in the process of being pulled out of the first shell 110. Therefore, the data bit P2 is read forward, and the specific data bit P2 is "0", "1", and "1" in this order. Thus, the position identification sensor 134 can determine the absolute position signal corresponding to the target position identifier 126 according to the data bit P2 and the forward read identifier. For example, the position identification sensor 134 may directly use the binary of the data bit P2 as the absolute position signal corresponding to the target position identifier 126. If the position identification sensor 134 successively reads the data bit P2 and the flag bit P1, it indicates that the tape 120 is currently in the process of retracting into the first shell 110. Therefore, the data bit P2 is read reversely, and "1", "1", and "0" are specifically read in this order. Thus, the position identification sensor 134 can determine the absolute position signal corresponding to the target position identifier 126 according to the data bit P2 and the reversely read identifier. For example, the position identification sensor 134 may directly use the binary of the data bit P2 as the absolute position signal corresponding to the target position identifier 126, or may use the reversely read data bit P2 and the reversely read identifier as the absolute position signal, and the data bit P2 in the target position identifier 126 is decoded by the first controller 150. The forward read identifier and the reversely read identifier are used for informing the first controller 150 that the tape 120 is currently in the state of being pulled out of or the state of retracting into the first shell 110. What the identifier specifically indicates may be set in advance, which will not be limited herein.

The position identification sensor 134 may be in communication with the first controller 150. Thus, the position identification sensor 134 can transmit an absolute position signal generated in case that a position identifier 126 is identified to the first controller 150. Further, in case of receiving no absolute position signal, the first controller 150 accumulates the received relative displacements to determine the relative length. After receiving the absolute position signal, the first controller 150 resets the relative length calculated by accumulation to zero. Specifically, it is assumed that the relative length DL-1 corresponding to accumulated 10000 images has been determined prior to receiving the absolute position signal. In response to receiving the absolute position signal, the first controller 150 resets the determined relative length DL-1 to zero. The first controller 150 will redetermine a relative length based on relative displacements received after resetting to zero. The redetermined relative length may be actually understood as a displacement at a preset position corresponding to the currently identified target position identifier 126 relative to the tape 120. If the preset position corresponding to the currently identified target position identifier 126 is 15 cm (i.e., the absolute length by which the tape extends out is 15 cm), that "the first controller 150 will redetermine a relative length based on relative displacements received after resetting to zero" in the present disclosure means that the first controller 150 will use "15 cm" as a starting point for calculating the relative length.

In the above embodiment, after receiving the absolute position signal, the first controller 150 further determines the position of the target position identifier 126 corresponding to the absolute position signal on the tape 120. Specifically, the first controller 150 may determine, based on the absolute position signal, the currently read position identifier 126 as the target position identifier 126 of which the data bit is binary "011". The first controller 150 may determine, according to the pre-stored one-to-one correspondence between each position identifier 126 and an actual extension length of the tape 120, the absolute length by which the tape currently extends out as 15 cm stored in association with the target position identifier 126. Further, the first controller 150 will redetermine a relative length based on relative displacements received after resetting to zero, where the relative length is added with the absolute length such as 15 cm to obtain the relative length corresponding to the current image. Further, the first controller 150 adds the relative length with the initial length, thereby determining the length by which the tape 120 extends out of the shell in the target direction D in real time.

In some other embodiments, the imaging sensor 132 may not only determine a relative displacement between two adjacent images, but also accumulate the determined relative displacements. For example, in the event that the image 520 corresponds to the tape 120 extending out of the first shell 110 relative to the image 510, if the relative displacement between the two images is positive value 0.110 and the relative displacement corresponding to the image 510 is 50 cm, the relative displacement corresponding to the image 520 is 50.110 cm. Therefore, the first controller 150 may determine the received relative displacement corresponding to an image as a relative length corresponding to the image and further add the relative length with the initial length to determine an extension length of the tape 120 in the target direction D at a time point when the image is acquired. In the present embodiment, the imaging sensor 132 may reset the accumulated relative displacement to zero upon receiving the absolute position signal. The measurement solution provided in the present embodiment may improve the accuracy of measurement. Specifically, the position identification sensor 134 is in communication with the first controller 150. Thus, the position identification sensor 134 can transmit an absolute position signal generated in case that a position identifier 126 is identified to the first controller 150. Further, after receiving the absolute position signal, the first controller 150 needs to inform the imaging sensor 132 that the accumulated relative displacement is reset to zero on the one hand. Specifically, the first controller 150 generates a resetting signal in response to receiving the absolute position signal, and transmits the resetting signal to the imaging sensor 132. In response to receiving the resetting signal, the imaging sensor 132 clears the determined relative displacement. After receiving the resetting signal, the imaging sensor 132 restarts to capture images at the preset frequency, and redetermines and accumulates relative displacements based on images captured after resetting to zero. The relative displacement may be actually understood as a displacement at a preset position corresponding to the currently identified target position identifier 126 relative to the tape on. If the preset position corresponding to the currently identified target position identifier 126 Displacement 15 cm (i.e., the absolute length by which the tape extends out is 15 cm), "redetermining relative displacements based on images captured after resetting to zero" in the present disclosure means determining displacements relative to "15 cm". In addition, for the specific implementation of the imaging sensor 132 redetermining relative displacements based on images captured after resetting to zero, see the embodiment described above, which will not be described here redundantly.

In the above embodiment, after receiving the absolute position signal, the first controller 150 determines the position of the target position identifier 126 corresponding to the absolute position signal on the tape 120 on the other hand. Specifically, the first controller 150 may determine, based on the absolute position signal, the currently read position identifier 126 as the target position identifier 126 of which the data bit is binary "011". The first controller 150 may determine, according to the pre-stored one-to-one correspondence between each position identifier 126 and an actual extension length of the tape 120, the absolute length by which the tape 120 currently extends out as the length stored in association with the target position identifier 126. Further, the first controller 150 receives the relative displacement which is redetermined and accumulated by the imaging sensor 132 based on the images captured after resetting to zero, and determines a relative length based on this, and then adds the determined relative length with the absolute length to obtain the relative length corresponding to the current image. Further, the first controller 150 adds the relative length to the initial length, thereby determining the length by which the tape 120 extends out of the first shell 110 in the target direction D in real time.

In some embodiments, the imaging sensor 132 may be configured to identify the position identifiers 126 in addition to determine the relative displacements. Therefore, the imaging sensor 132 needs to be disposed opposite to the side of the tape 120 that has the position identifiers 126. Specifically, the first controller 150 determines an absolute length of the tape 120 based on an identification result of a position identifier 126 by the imaging sensor 132, and the imaging sensor 132 resets the determined relative displacement to zero after identifying the position identifier 126 and redetermines a relative displacement. Finally, the first controller 150 determines the length by which the tape 120 extends out of the first shell 110 in the target direction D in real time based on the redetermined relative displacement and the absolute length corresponding to the identified position identifier 126.

Figure 6:
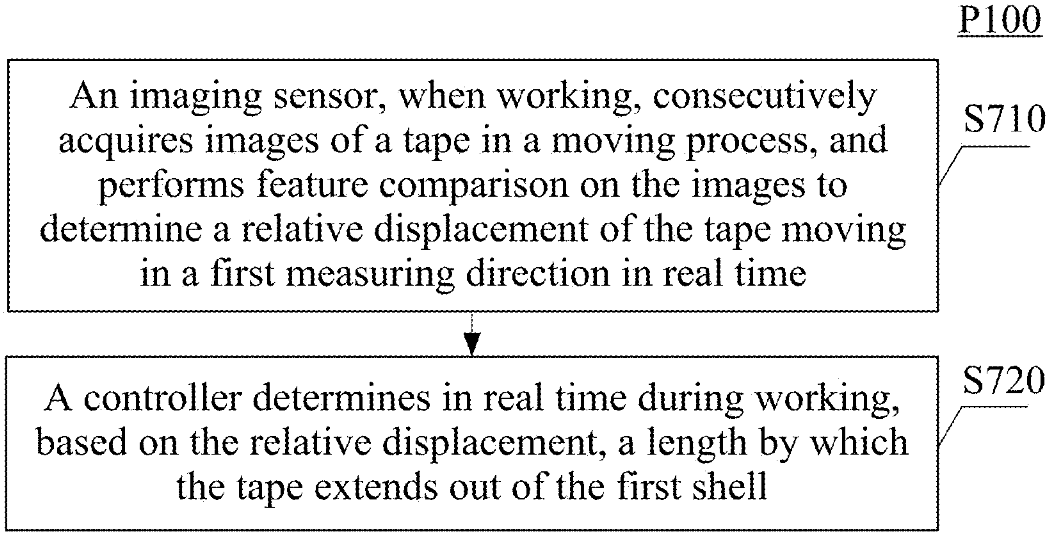
FIG. 6 is a flowchart of a measuring method provided according to some exemplary embodiments of the present disclosure.

FIG. 6 is a flowchart of a measuring method P100 provided according to some exemplary embodiments of the present disclosure. A performing agent of the measuring method P100 provided herein is the tape measure 100. With reference to FIG. 6, the measuring method P100 provided herein may include S710 and S720.

In S710, the imaging sensor 132, during working, consecutively acquires images of the tape 120 in the moving process, and performs feature comparison on the images to determine a relative displacement of the tape 120 moving in the target direction D in real time.

In response to the tape measure 100 changing from an initial state to a working state, the first controller 150 controls the imaging component 132-1 (e.g., a micro CMOS camera) to start working. The imaging component 132-1 captures images in the moving process of the tape to consecutively acquire the images of the tape 120 in the moving process and further transmits the acquired images to the image processing circuit 132-3 in real time. The initial state and the working state of the tape measure 100 are as described above, which will not be described here redundantly.

For example, the image processing circuit 132-3 performs feature comparison on the images consecutively acquired by the imaging component 132-1, and determines, based on a moving distance of a same feature between a set of adjacent images, a moving distance of the tape 120 in the target direction D corresponding to the set of adjacent images. The image processing circuit 132-3 may successively transmit, as the relative to displacement, the moving distance of the tape 120 in the target direction D corresponding to each set of adjacent images to the first controller 150. The image processing circuit 132-3 may determine the moving distances of the tape 120 in the target direction D corresponding to a plurality of sets of adjacent images and then transmit the moving distance of the tape 120 in the target direction D corresponding to the last set of adjacent images to the first controller 150.

As described previously, the relative displacement is a vector, which will not be described here redundantly.

Continuously referring to FIG. 6, in S720, the first controller 150 determines, during working and based on the relative displacement, a length by which the tape 120 extends out of the first shell 110 in real time.

In some embodiments, after receiving the relative displacement corresponding to the current image, the first controller 150 adds the relative displacement corresponding to the current image with a relative length corresponding to the previous image to obtain a relative length corresponding to the current image. The relative length corresponding to the current image is a displacement of the tape 120 relative to the first outlet 114 in the target direction D that is calculated by the first controller 150, starting from the first controller 150 controlling the imaging sensor 132 to start working to a time point when the current image is acquired.

It will be understood that, as described previously, the limiting lug 112 has a thickness and the tape measure 100 may have a manufacturing error. For the above situation of the tape measure 100, after receiving the relative displacement transmitted by the imaging sensor 132, the first controller 150 adds the pre-stored initial length by which the tape 120 extends out of the first shell 110 with the relative length in real time to obtain the length by which the tape 120 extends out of the first shell 110 in real time.

Figure 7:
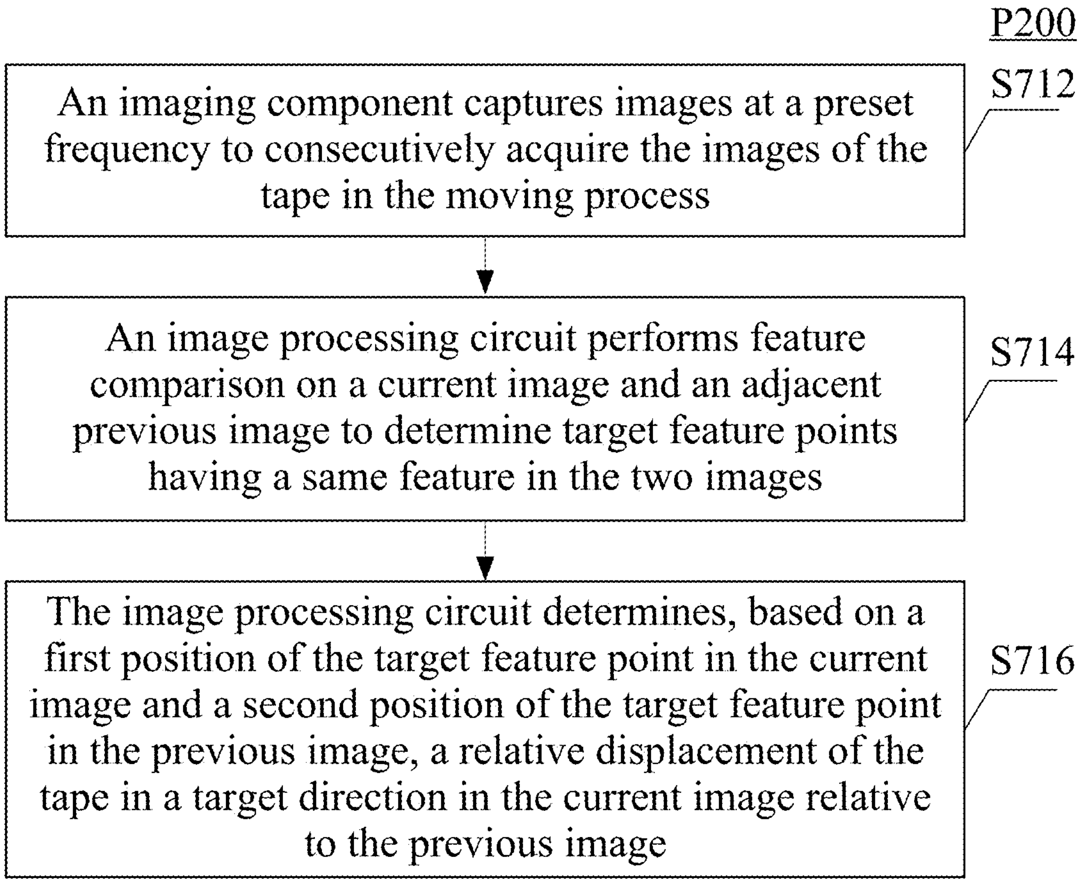
FIG. 7 is a flowchart of a method for determining a relative displacement by an imaging sensor provided according to some exemplary embodiments of the present disclosure.

FIG. 7 is a flowchart of a method P200 for determining a relative displacement by an imaging sensor 132 provided according to some exemplary embodiments of the present disclosure. With reference to FIG. 7, the shown method P200 includes S712-S718, which may be regarded as a specific implementation of S710 in P100.

In S712, the imaging component 132-1 captures images at a preset frequency to consecutively acquire the images of the tape 120 in the moving process.

In S714, the image processing circuit 132-3 performs feature comparison on a current image and an adjacent previous image to determine target feature points having a same feature in the two images; and in S716, the image processing circuit 132-3 determines the relative displacement of the tape in the target direction D in the current image relative to the previous image based on a first position of the target feature point in the current image and a second position of the target feature point in the previous image.

In some embodiments, with reference to FIG. 4, the image processing circuit 132-3 may regard the image 520 as the current image and the image 510 as the previous image to the current image. The specific processes of steps S712, S714, and S176 are as described previously, which will not be described here redundantly.

In some embodiments, after the imaging sensor 132 determines the relative displacement corresponding to the current image by the method P200, the image processing circuit 132-3 of the imaging sensor transmits the relative displacement corresponding to the current image to the first controller 150 such that the first controller 150 to further determine a total length by which the tape 120 extends out in the target direction D. As described previously, a frequency or an interval at which the image processing circuit 132-3 of the imaging sensor 132 transmits relative displacements to the first controller 150 is as described previously, which will not be described here redundantly.

Herein, due to a high capturing frequency of the imaging component 132-1 of the imaging sensor 132, it can also be effectively ensured that the first controller 150 can guarantee the instantaneity of determining the extension length of the tape 120 and can also reduce the number of times of information interaction, thereby reducing the power consumption of the tape measure 100.

In an exemplary embodiment, after determining the length by which the tape 120 extends out of the first shell 110, the first controller 150 may control the output assembly to output measurement data in real time. For example, the measurement data is controlled to be displayed on a display screen of the tape measure 100 in real time, and/or the measurement data is controlled to be broadcast in voice by a speaker of the tape measure 100. For another example, the measurement data is transmitted to an external device through an output interface so as to be displayed on a display screen of the external device and/or broadcast in voice by a speaker of the external device. For example, in the process of the tape 120 being pulled out of/retracting into the first shell 110, numbers shown on the display screen constantly change as the tape 120 is pulled out/retracts. When the tape 120 stops moving, the numbers shown on the display screen correspond to a current length by which the tape 120 extends out. Thus, it is realized that a measurement result is automatically provided for a user and the user does not need to view the measurement reading of the tape with naked eyes. This is not only convenient for the user to determine the measurement data, but also avoids an error caused by viewing with naked eyes, thus being conducive to improving the accuracy of measurement.

As described previously, to further improve the accuracy of measurement, the embodiment of the present disclosure further provides the tape measure 100 with the correction function.

Figure 8:
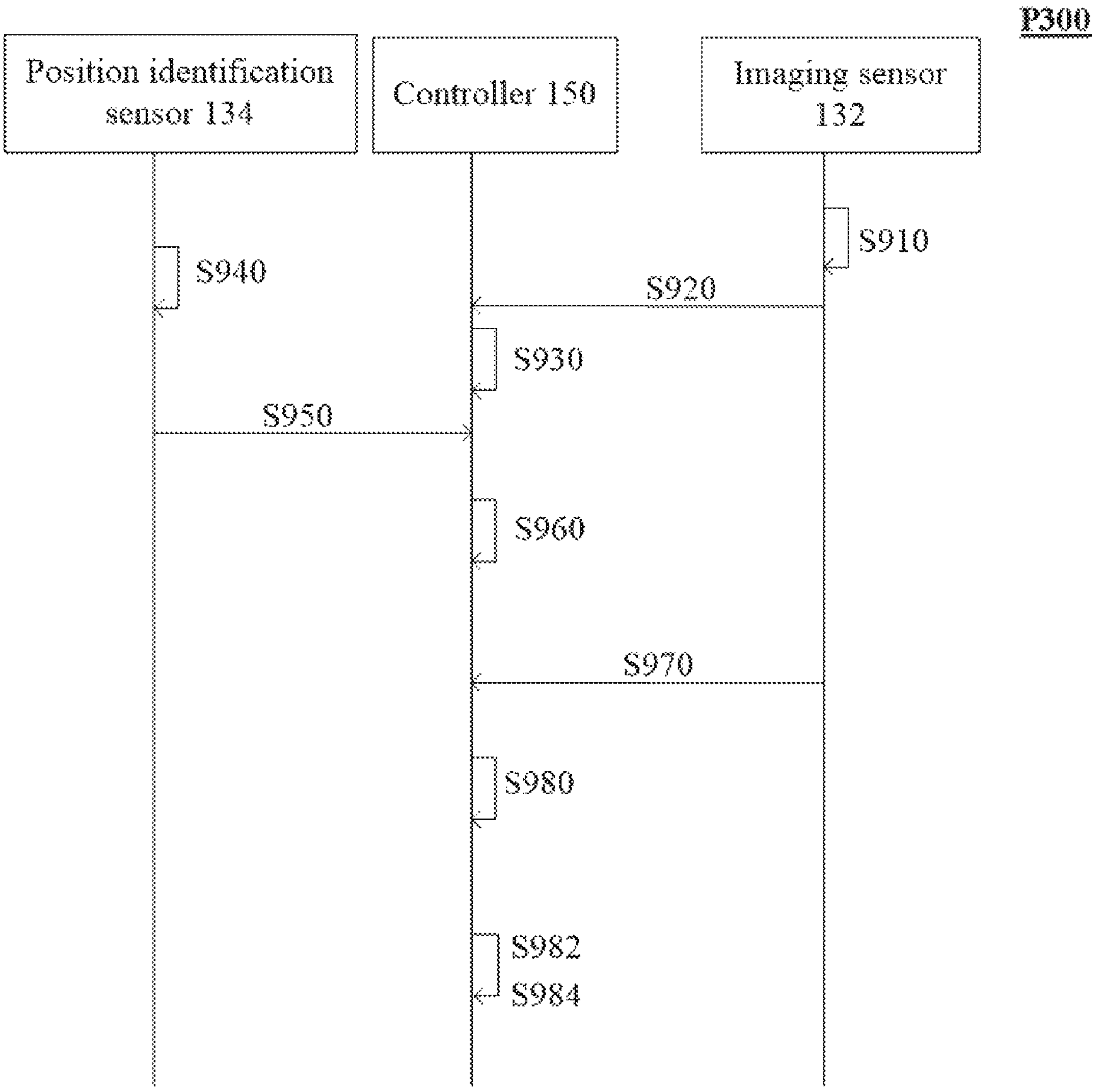
FIG. 8 is a schematic diagram of interaction of a measuring method provided according to some exemplary embodiments of the present disclosure.

FIG. 8 is a schematic diagram of interaction of a measuring method P300 provided according to some exemplary embodiments of the present disclosure. With reference to FIG. 8, the method P300 provides a measuring method performed by the tape measure 100 including the position identifier 126 and the position identification sensor 134. As shown in FIG. 8, the method P300 may include:

S910, the imaging sensor 132, during working, consecutively acquires images of the tape 120 in the moving process, and performs feature comparison on the images to determine a relative displacement of the tape 120 moving in the target direction D in real time. The specific implementation of the imaging sensor 132 determining the relative displacement has been described in detail above, which will not be described here redundantly.

As shown in FIG. 8, the method P300 may further include:

S920: the first controller 150 receives the relative displacement determined by the imaging sensor; and S930: the first controller 150 adds a relative displacement corresponding to a current image with a relative length corresponding to a previous image to obtain a relative length corresponding to the current image. The principle of determining the relative length by the first controller 150 has been described in detail in the foregoing embodiments, which will not be described here redundantly.

As shown in FIG. 8, the method P300 may further include:

S940: the position identification sensor 134 reads a position identifier 126 on the tape 120 that passes by the position identification sensor 134 in the moving process; and S950, the position identification sensor 134 generates a corresponding absolute position signal and transmits it to the first controller 150. The principle of identifying the position identifier 126 by the position identification sensor 134 has been described in detail in the foregoing embodiments, which will not be described here redundantly. In case of identifying a position identifier 126, the position identification sensor 134 generates an absolute position signal corresponding to the identified position identifier 126. Further, the position identification sensor 134 transmits the absolute position signal corresponding to the identified position identifier 126 to the first controller 150.

As shown in FIG. 8, the method P300 may further include:

S960: the first controller 150 receives the absolute position signal and resets an accumulated relative length to zero based on the absolute position signal; and S970: the first controller 150, after the processing of resetting to zero, receives relative displacements from the imaging sensor 132 and starts new accumulation. In some embodiments, after receiving the absolute position signal, the first controller 150 resets the accumulated relative length to zero, in order to avoid or reduce error accumulation in the relative displacement.

As shown in FIG. 8, the method P300 may further include:

S980: the first controller 150 determines, during working and based on the relative displacement, a length by which the tape 120 extends out of the first shell 110 in real time.

For example, in the tape measure 100 having the position identifiers 126 and the position identification sensor 134, a specific implementation that the first controller 150 determines a length by which the tape 120 extends out of the first shell 110 includes:

S982: the first controller 150 identifies, based on an absolute position signal, an absolute length corresponding to the absolute position signal; and S984: the first controller 150 accumulates the absolute length corresponding to the preset position with the relative displacement in real time to obtain the length by which the tape 120 extends out of the first shell 110 in real time.

In some embodiments, after receiving the absolute position signal, the first controller 150 further determines the position of the target position identifier 126 corresponding to the absolute position signal on the tape 120 to obtain the absolute length corresponding to the target position identifier 126. Specifically, the first controller 150 may determine, based on the absolute position signal, the currently read position identifier 126 as the target position identifier 126 of which the data bit is binary "011". The first controller 150 may determine, according to the pre-stored one-to-one correspondence between each position identifier 126 and an actual extension length (i.e., an absolute length) of the tape 120, the absolute length by which the tape 120 currently extends out as the length stored in association with the target position identifier 126.

Further, the first controller 150 determines a relative length based on the absolute length and relative displacements received after resetting to zero. For example, the first controller 150 adds the relative length with the initial length, thereby determining the length by which the tape 120 extends out of the shell in the target direction D in real time.

Figure 9:
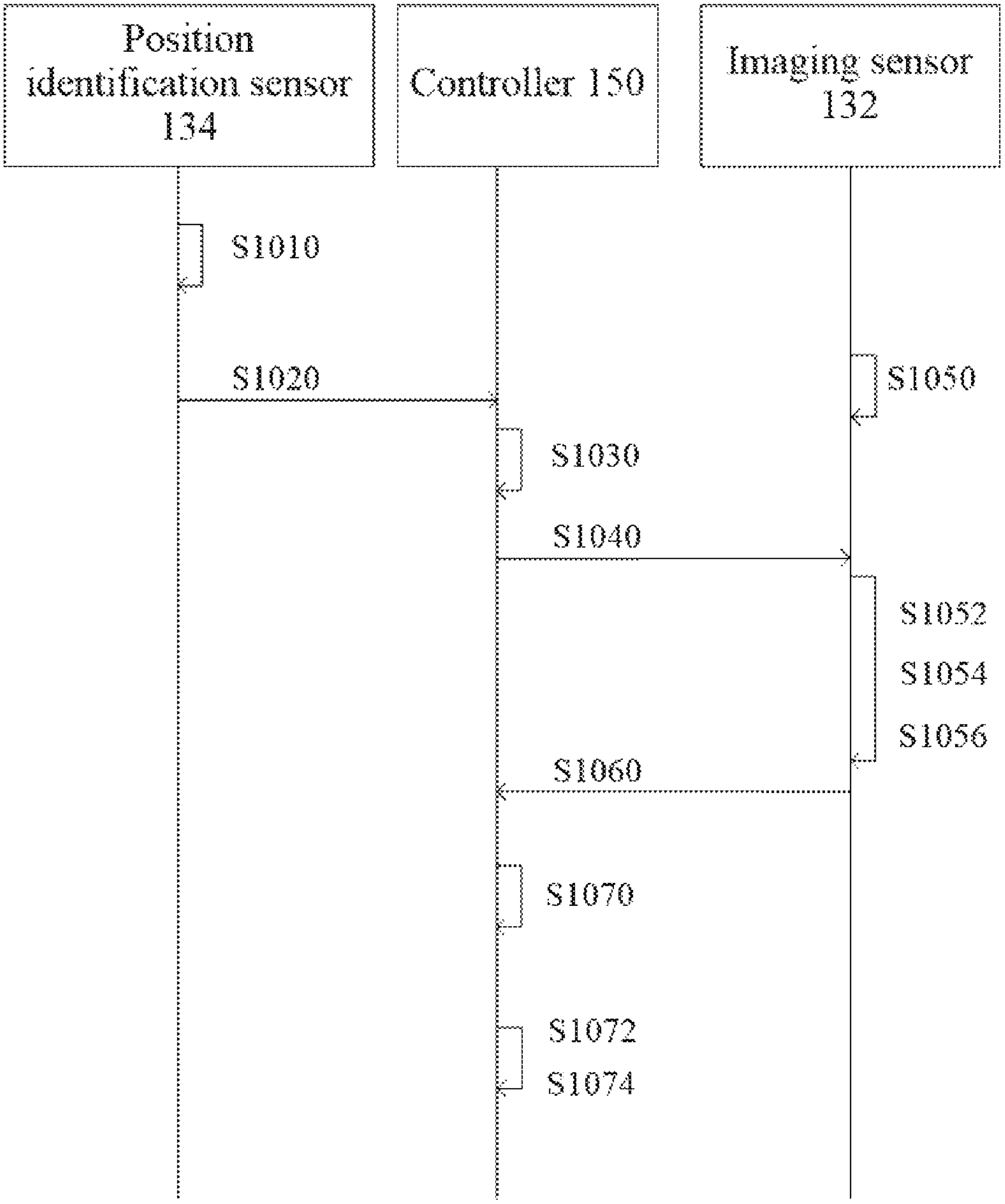
FIG. 9 is another schematic diagram of interaction of a measuring method provided according to some exemplary embodiments of the present disclosure.

FIG. 9 is another schematic diagram of interaction of a measuring method P400 provided according to some exemplary embodiments of the present disclosure. With reference to FIG. 9, the method P400 provides a measuring method performed by the tape measure 100 including the position identifier 126 and the position identification sensor 134. The imaging sensor 132 may not only determine a relative displacement between adjacent images, but also accumulate the relative displacements. The imaging sensor 132 may receive a resetting signal transmitted by the first controller 150 and resets the accumulated relative displacement to zero based on the received resetting signal. As shown in FIG. 9, the method P400 may include:

S1010: the position identification sensor 134 reads a position identifier 126 on the tape 120 that passes by the position identification sensor 134 in the moving process; and S1020, the position identification sensor 134 generates a corresponding absolute position signal and transmits it to the first controller 150. The principle of identifying the position identifier 126 by the position identification sensor 134 has been described in detail in the foregoing embodiments, which will not be described here redundantly. In case of identifying a position identifier 126, the position identification sensor 134 generates an absolute position signal corresponding to the identified position identifier 126. Further, the position identification sensor 134 transmits the absolute position signal corresponding to the identified position identifier 126 to the first controller 150.

As shown in FIG. 9, the method P400 may further include:

S1030: the first controller 150 receives the absolute position signal and generates a resetting signal based on the absolute position signal; and S1040: the first controller 150 transmits the resetting signal to the imaging sensor 132 to reset the relative displacement of the imaging sensor 132 to zero.

In some embodiments, after receiving the absolute position signal, the first controller 150 needs to inform the imaging sensor 132 that the accumulated relative displacement is reset to zero, avoiding error accumulation in the relative displacement. Specifically, the first controller 150 further generates a resetting signal in response to receiving the absolute position signal, and transmits the resetting signal to the imaging sensor 132.

As shown in FIG. 9, the method P400 may further include:

S1050, the imaging sensor 132, during working, consecutively acquires images of the tape 120 in the moving process, and performs feature comparison on the images to determine a relative displacement of the tape 120 moving in the target direction D in real time.

For example, in the tape measure 100 having the position identifiers 126 and the position identification sensor 134, a specific implementation that the imaging sensor 132 determines the relative displacement may include:

S1052: the imaging sensor 132 receives a resetting signal;

S1054: the imaging sensor 132 resets the relative displacement determined by the imaging sensor 132 to zero based on the resetting signal; and S1056: the imaging sensor 132 determines the relative displacement based on images after resetting to zero. In this case, the relative displacement includes a relative displacement of the tape 120 in the target direction D after the resetting signal. As shown in FIG. 9, the method P400 may further include:

S1060: the imaging sensor 132 transmits the relative displacement to the first controller 150.

As shown in FIG. 9, the method P400 may further include:

S1070: the first controller 150 determines, during working and based on the relative displacement, a length by which the tape 120 extends out of the first shell 110 in real time.

For example, in the tape measure 100 having the position identifiers 126 and the position identification sensor 134, a specific implementation that the first controller 150 determines a length by which the tape 120 extends out of the first shell 110 includes:

S1072: the first controller 150 identifies, based on an absolute position signal, a preset position corresponding to the absolute position signal; and S1074: the first controller 150 accumulates the absolute length corresponding to the preset position with the relative displacement in real time to obtain the length by which the tape 120 extends out of the first shell 110 in real time.

Specifically, in case of receiving no absolute position signal, the first controller 150 may determine the relative displacement corresponding to the current image transmitted by the imaging sensor 132 as a relative length corresponding to the current image, and further may determine an extension length of the tape 120 in the target direction D at a time point when the current image is acquired by adding the relative length corresponding to the current image with the initial length. In case of receiving the absolute position signal, the first controller 150 may add the relative displacement corresponding to the current image transmitted by the imaging sensor 132 and the latest determined absolute length, determined as the relative length corresponding to the current image, and further may determine the extension length of the tape 120 in the target direction D at the time point when the current image is acquired by adding the relative length corresponding to the current image with the initial length.

Figure 10:
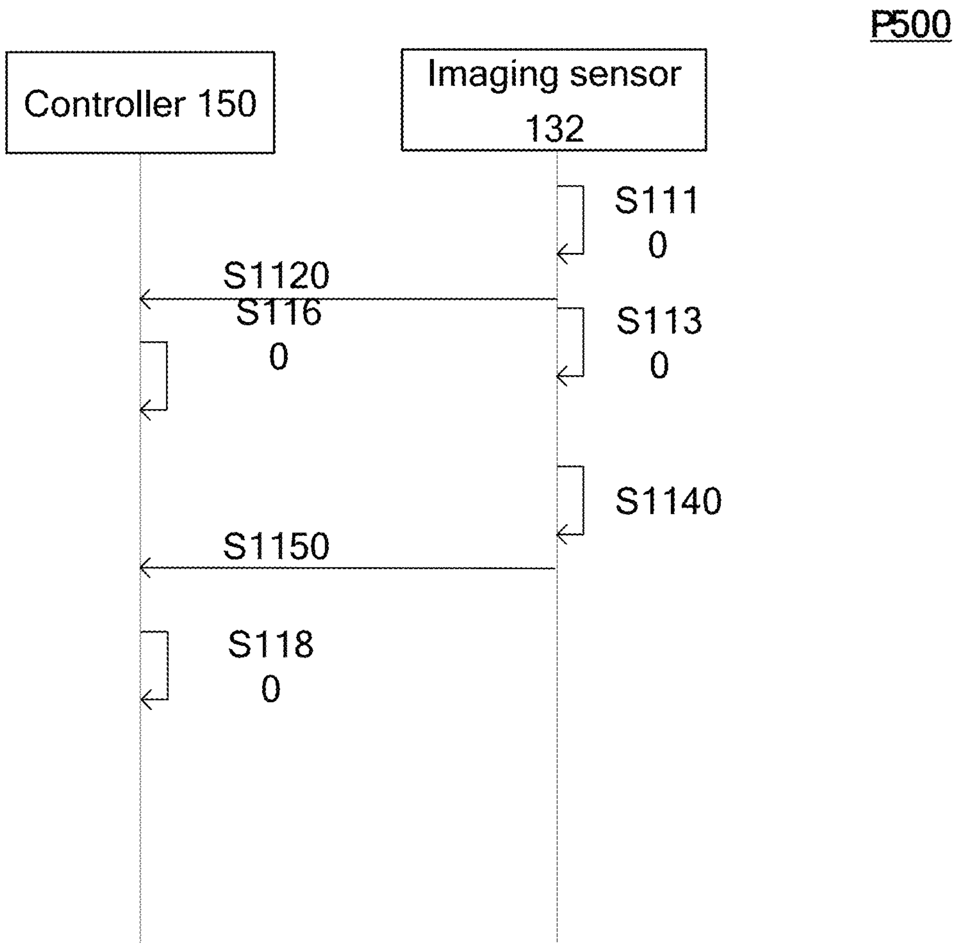
FIG. 10 is further another schematic diagram of interaction of a measuring method provided according to some exemplary embodiments of the present disclosure.

FIG. 10 is further another schematic diagram of interaction of a measuring method P500 provided in some exemplary embodiments of the present disclosure. With reference to FIG. 10, no position identification sensor 134 as described in the foregoing embodiments of the present disclosure is provided in some exemplary embodiments provided by the method P500, and instead, the position identifiers 126 are identified by the imaging sensor 132. It needs to be noted that in this embodiment, the imaging sensor 132 is disposed opposite to the side of the tape 120 that has the position identifiers 126. Specifically, the method P500 may include:

S1110: the imaging sensor 132 reads a position identifier 126 on the tape 120 that passes by the imaging sensor 132 in the moving process and generates a corresponding absolute position signal;

S1120, the imaging sensor 132 transmits the generated absolute position signal to the first controller 150;

S1130: the imaging sensor 132 resets the relative displacement determined by the imaging sensor 132 to zero based on the absolute position signal;

S1140: the imaging sensor 132 determines a relative displacement based on images after resetting to zero, where the relative displacement includes a relative displacement of the tape 120 in the target direction D after the processing of resetting to zero;

S1150, the imaging sensor 132 transmits the determine relative displacement to the first controller 150;

S1160: the first controller 150 identifies, based on an absolute position signal, a preset position corresponding to the absolute position signal; and S1180: the first controller 150 accumulates the absolute length corresponding to the preset position with the relative displacement in real time to obtain the length by which the tape 120 extends out of the first shell 110 in real time.

As can be seen through the embodiment provided by FIG. 10, the position identifiers 126 are identified by the imaging sensor 132. Then, on the one hand, the imaging sensor 132 resets the relative displacement accumulated and calculated by itself to zero and redetermines a relative displacement according to images captured after resetting to zero; on the other hand, an absolute position signal is generated to inform the first controller 150, allowing the first controller 150 to determine an absolute length. Further, the first controller 150 accumulates the determined absolute length with the relative displacement transmitted by the imaging sensor 132 after resetting to zero to determine the length by which the tape 120 extends out of the first shell 110 in real time.

Figure 11:
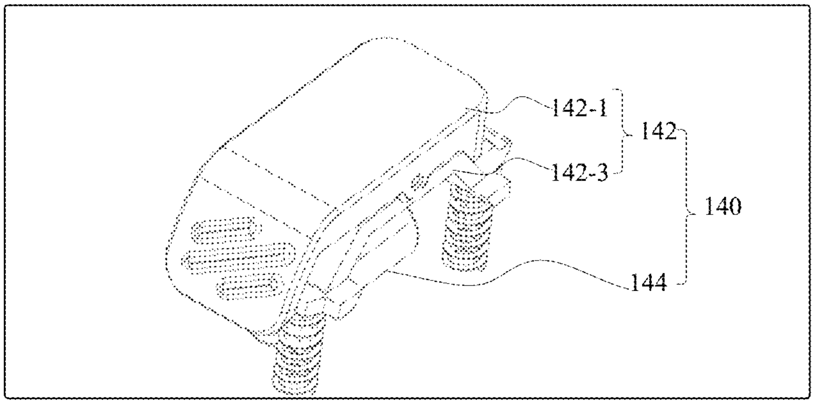
FIG. 11 is a structural schematic diagram of a brake assembly provided according to some exemplary embodiments of the present disclosure.

In some embodiments, with reference to FIG. 1, the tape measure 100 may further include a brake assembly 140. FIG. 11 is a structural schematic diagram of a brake assembly 140 provided according to some exemplary embodiments of the present disclosure. With reference to FIG. 11, the brake assembly 140 may be mounted on the first shell 110. The brake assembly 140 may include an execution component 142 and a braking component 144. The braking component 144 is mounted in the first shell 110 and can come into contact with or be separated from the tape 120. In a state in which the braking component 144 is in contact with the tape 120, braking of the tape 120 may be realized. In a state in which the braking component 144 is separated from the tape 120, the tape 120 may be changed from a braked state to a non-braked state, thus realizing release of the tape 120 in the braked state.

With reference to FIG. 11, the execution component 142 provided herein includes an execution body 142-1 and a connecting piece 142-3. The execution body 142-1 includes two triggering surfaces that can receive triggering forces in difference directions, respectively. Thus, the problem of inflexible measurement caused by a single triggering surface of the brake assembly in the existing tape measure can be avoided. The connecting piece 142-3 is movably mounted in the first shell 110 and movably connected to the execution body 142-1. In the event that any one of the two triggering surfaces of the execution body 142-1 receives a triggering force in a corresponding direction, the execution body 142-1 can drive the connecting piece 142-3 to move in a first direction (e.g., direction D1 shown in FIG. 12A) relative to the first shell 110, thereby driving the braking component 144 to come into contact with or be separated from the tape 120. In this way, braking or release of the tape 120 is realized. The first direction D1 is perpendicular to the target direction D in which the tape 120 moves, and the first direction D1 is perpendicular to a first triggering surface 142-11.

The tape measure 100 provided herein is provided with the execution body 142-1 with two triggering surfaces and the connecting piece 142-3 movably connected to the execution body 142-1. Thus, in the event that any triggering surface receives a triggering surface, the execution body 142-1 may drive the connecting piece 142-3 to move in the first direction D1, thereby actuating the braking component 144 to change from a separate state to a contact state between the braking component 144 and the tape 120 or change from the contact state to the separate state between the braking component 144 and the tape 120. As can be seen, in the process of measuring using the tape measure 100, even though one triggering surface of the execution body 142-1 presses against other obstacle so that a user cannot reach the triggering surface, the user may also control the tape 120 by means of the other triggering surface of the execution body 142-1. Thus, the measurement flexibility is effectively improved.

Figure 12A:
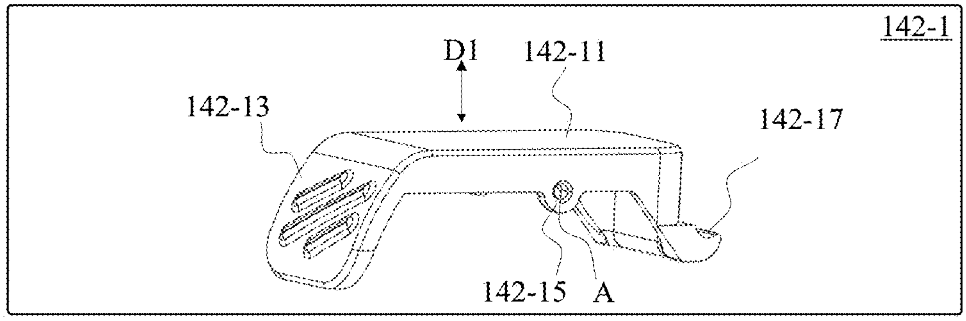
FIG. 12A is a structural schematic diagram of an execution body provided according to some exemplary embodiments of the present disclosure at an angle of view.
Figure 12B:
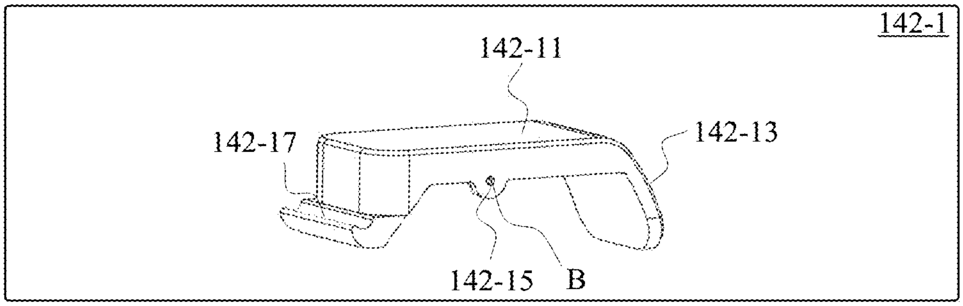
FIG. 12B is a structural schematic diagram of the execution body provided according to the embodiment of the present disclosure at another angle of view.

FIG. 12A and FIG. 12B are structural schematic diagrams of the execution body 142-1 provided according to the embodiment of the present disclosure at different angles of view, respectively. With reference to FIG. 12A and FIG. 12B, the execution body 142-1 provided herein may include a first triggering surface 142-11 and a second triggering surface 142-13. In some embodiments, the execution body 142-1 may further include a rotational connection portion 142-15. In some embodiments, the execution body 142-1 may further include a rotation limiting portion (denoted as "first rotation limiting portion", as shown at 142-17 in the figure).

With reference to FIG. 12A and FIG. 12B, the first triggering surface 142-11 is not parallel to the second triggering surface 142-13. Specifically, the second triggering surface 142-13 is inclined at an included angle toward the tape 120 relative to the first triggering surface 142-11. For example, the angle of inclination may be an acute angle in FIG. 12A. Thus, the two triggering surfaces may receive triggering forces in different directions, respectively. When any one of the first triggering surface 142-11 and the second triggering surface 142-13 is triggered, the execution component 142 drives the braking component 144 to come into contact with or be separated from the tape 120. In some embodiments, in the event that the first triggering surface 142-11 is not triggered, the first triggering surface 142-11 is parallel to a first side surface of the first shell 110, and the first triggering surface 142-11 is disposed in an opening of the first side surface. For example, the first triggering surface 142-11 and the first side surface of the first shell 110 are coplanar or approximately coplanar. In the event that the second triggering surface 142-13 is not triggered, the second triggering surface 142-13 is parallel to a second side surface of the first shell 110, and the second triggering surface 142-13 is disposed in an opening of the second side surface. For example, the second triggering surface 142-13 and the second side surface of the first shell 110 are coplanar or approximately coplanar. Thus, in the process of measuring using the tape measure 100, the triggering surfaces would not affect the fit of the tape measure 100 with other objects, which is conducive to ensuring the accuracy of measurement.

In some embodiments, with reference to FIG. 12A and FIG. 12B, the first triggering surface 142-11 may be roughly in a rectangular shape. The second triggering surface 142-13 is disposed in a side surface with a first pair of edges (e.g., rectangular short edges shown in the figure), and the rotational connection portion 142-15 is provided on a side surface with a second pair of edges (e.g., rectangular long edges shown in the figure). For example, holes for shaft connection are formed in the side surface with the second pair of edges and roughly at midpoints of the long edges, respectively, such as hole A in FIG. 3A and hole B in FIG. 3B. Specifically, the execution body 142-1 may be movably connected to, in particular, in rotational connection with the connecting piece 142-3 by means of the rotational connection portion 142-15. The rotational connection portion 142-15 may be specifically located on a side opposite to the first triggering surface 142-11. That is, a rotation center of the rotational connection is disposed opposite to the first triggering surface 142-11; meanwhile, the rotation center of the rotational connection is disposed eccentrically from the second triggering surface 142-13.

In some embodiments, with reference to FIG. 12A and FIG. 12B, the second triggering surface 142-13 is located at one end of the first triggering surface 142-11, and the first rotation limiting portion 142-17 is located at an end, far away from the second triggering surface 142-13, of the first triggering surface 142-11. Specifically, the first rotation limiting portion 142-17 is disposed at the side surface with the first pair of edges as described in the foregoing embodiment. For example, in the event that the first triggering surface 142-11 is triggered, the execution body 142-1 moves in the first direction D1 along with the connecting piece 142-3 driven by the execution body with no relative rotation therebetween. In this case, there is no interaction force between the first rotation limiting portion 142-17 and the first shell 110. In the event that the second triggering surface 142-13 is triggered, there is relative rotation or a trend of relative rotation between the execution body 142-1 and the connecting piece 142-3 driven by the execution body. In order to ensure that the connecting piece 142-3 moves in the first direction D1, the relative rotation or the trend of relative rotation needs to be limited. Therefore, in this case, the first rotation limiting portion 142-17 is mated with the first shell 110 to limit the relative rotation or the trend of relative rotation, thus ensuring that the connecting piece 142-3 moves in the first direction D1, which in turn ensures that the execution component 142 smoothly triggers or separates the tape 120.

Based on the structure of the execution body 142-1 described above, when the first triggering surface 142-11 is triggered, the execution body 142-1 drives, by means of the rotational connection, the connecting piece 142-3 to move in the first direction. When the second triggering surface 142-13 is triggered, the first rotation limiting portion 142-17 is mated with the first shell 110 to limit the rotation of the execution body 142-1 relative to the connecting piece 142-3, thus ensuring that the execution body 142-1 drives the connecting piece 142-3 to move in the first direction D1.

Figure 13:
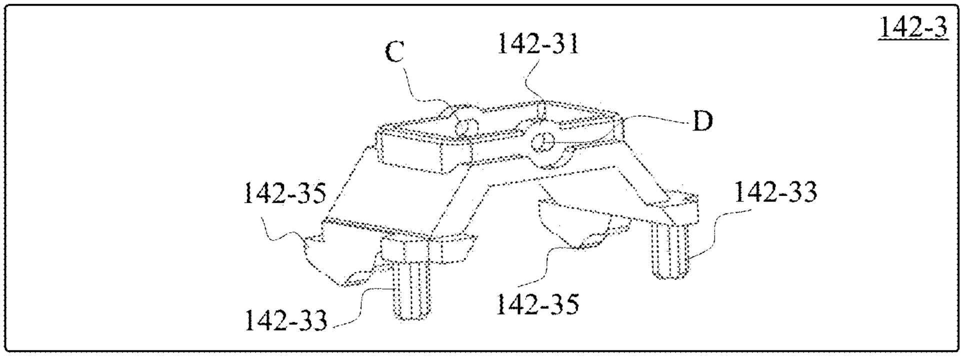
FIG. 13 is a structural schematic diagram of a connecting piece provided according to some exemplary embodiments of the present disclosure.

FIG. 13 is a structural schematic diagram of a connecting piece 142-3 provided according to some exemplary embodiments of the present disclosure. With reference to FIG. 13, the connecting piece 142-3 provided herein may include a rotational engagement portion 142-31. In some embodiments, the connecting piece 142-3 may further include a guiding portion 142-33. In some embodiments, the connecting piece 142-3 provided herein may further include a driving portion 142-35.

With reference to FIG. 13, the rotational engagement portion 142-31 may be specifically provided with hole C and hole D. Thus, the rotational connection between the connecting piece 142-3 and the execution body 142-1 may be realized by means of the holes of the rotational engagement portion 142-31 and the holes of the rotational connection portion 142-15.

The guiding portion 142-33 is disposed in the first direction D1 and slidably connected to the first shell 110 in the first direction D1. Thus, in the event that any triggering surface of the execution body 142-1 is triggered, the connecting piece 142-3 movably connected to the execution body 142-1 is capable of moving in the first direction D1, thereby driving the braking component 144 to be separated from or come into contact with the tape 120. In some embodiments, at least a group of guiding portions 142-33 may be provided. Each group of guiding portions 142-33 includes two guiding portions which are specifically distributed on the left and right sides of the tape 120 to ensure the stability of the connecting piece 142-3 moving in the first direction D1.

In the process of the connecting piece 142-3 moving in the first direction D1, the driving portion 142-35 is configured to drive the braking component 144, and specifically drive the braking component 144 to come into contact with or be separated from the tape 120, thus realizing braking or release of the tape 120. For example, at least a group of driving portions 142-35 may be provided. Each group of driving portions 142-35 includes two driving portions which are specifically distributed on the left and right sides of the tape 120.

Figure 14:
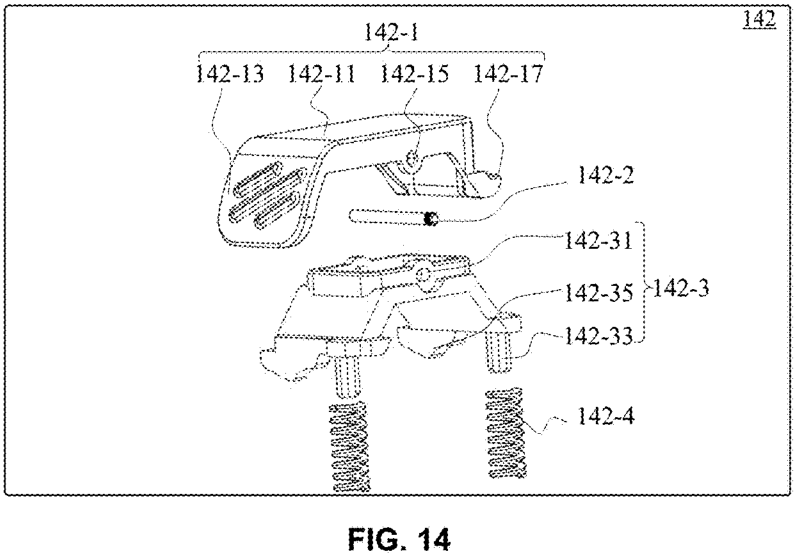
FIG. 14 is a structural schematic diagram of an execution component provided according to some exemplary embodiments of the present disclosure.

FIG. 14 is a structural schematic diagram of an execution component 142 provided according to some exemplary embodiments of the present disclosure. In addition to the execution body 142-1 and the connecting piece 142-3, the execution component 142 may further include a connecting shaft 142-2. In some embodiments, the execution component 142 may further include an elastic supporting portion 142-4.

The execution body 142-1 may be connected to the connecting piece 142-3 by means of the connecting shaft 142-2. Specifically, the connecting shaft 142-2 passes through the hole A, the hole C, the hole D, and the hole B in this order, thereby realizing rotational connection between the execution body 142-1 and the connecting piece 142-3. Thus, when the first triggering surface 142-11 is triggered, the execution body 142-1 drives, by means of the rotational connection, the connecting piece 142-3 to move in the first direction D1. When the second triggering surface 142-13 is triggered, if there is no first rotation limiting portion 142-17, the execution body 142-1 and the connecting piece 142-3 rotate relatively relative to the rotational connection. When the second triggering surface 142-13 is triggered, the first rotation limiting portion 142-17 is mated with the first shell 110 to limit the rotation of the execution body 142-1 relative to the connecting piece 142-3, thus ensuring that the execution body 142-1 can drive the connecting piece 142-3 to move in the first direction D1 in the event that any triggering surface is triggered.

In some embodiments, with reference to FIG. 14, one end of the elastic supporting portion 142-4 is fixed within the first shell 110, and the other end of the elastic supporting portion 142-4 is connected to the connecting piece 142-3. The elastic supporting portion 142-4 is configured to support the connecting piece 142-3 such that the connecting piece 142-3 generates no driving force for the braking component 144 when both of the first triggering surface 142-11 and the second triggering surface 142-13 are not triggered, or the connecting piece 142-3 generates a small driving force for the braking component 144, which will not cause the braking component 144 to move. The elastic supporting portion 142-4 may be used in combination with the guiding portion 142-33 in the connecting piece 142-3. The number of the elastic supporting portions 142-4 is related to the number of the guiding portions 142-33, and the position of the elastic supporting portion 142-4 disposed within the first shell 110 is related to the mounting position of the guiding portion 142-33. In the event that the tape measure 100 is provided with one group of guiding portions 142-33, one group of elastic supporting portions 142-4 may be provided. For example, the elastic supporting portion 142-4 may be a spring. Specifically, the guiding portion 142-33 passes through a hole in the center of the spring, which is conducive to ensuring that the connecting piece 142-3 can stably move in the first direction D1. In the event that any triggering surface is not triggered, under the supporting action of the elastic supporting portion 142-4, the driving force generated by the connecting piece 142-3 for the braking component 144 does not cause the braking component 144 to move to ensure the stability of control on the tape 120. in the event that any triggering surface is triggered, the elastic supporting portion 142-4 is compressed in the first direction D1, and the execution body 142-1 and the connecting piece 142-3 move in the first direction D1, and the driving force generated by the connecting piece 142-3 for the braking component 144 causes the braking component 144 to move to control the braked state of the tape 120.

Figure 15:
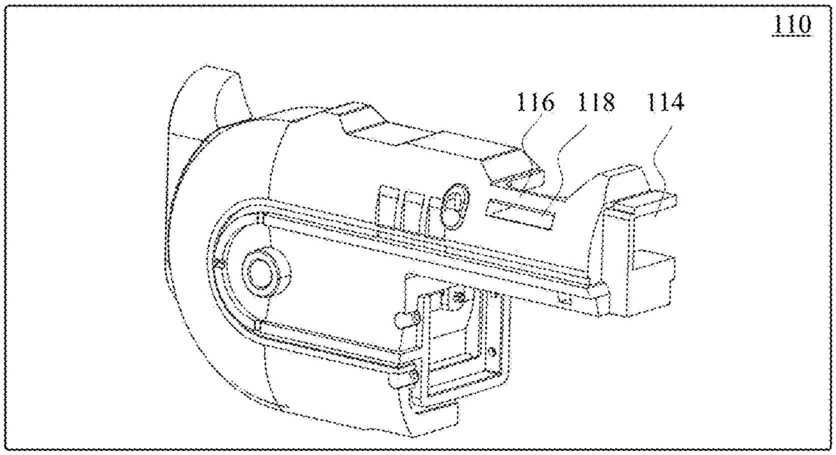
FIG. 15 is a structural schematic diagram of a first shell provided according to some exemplary embodiments of the present disclosure.

FIG. 15 is a structural schematic diagram of a first shell 110 provided according to some exemplary embodiments of the present disclosure. The first shell 110 may further include a limiting member 116. The limiting member 116 is located on a side, far away from the connecting piece 142-3, of the execution body 142-1, and the limiting member 116 is disposed opposite to the first rotation limiting portion 142-17 of the execution body 142-1. Specifically, when the second triggering surface 142-13 of the execution body 142-1 is triggered, in case of no limiting member 116 provided, the execution body 142-1 will rotate relative to the connecting piece 142-3. Herein, when the second triggering surface 142-13 of the execution body 142-1 is triggered, the limiting member 116 presses against the first rotation limiting portion 142-17 of the execution body 142-1 to limit the rotation of the execution body 142-1 relative to the connecting piece 142-3, thus causing the execution body 142-1 to drive, by means of the rotational connection portion 142-15, the connecting piece 142-3 to move in the first direction D1.

Figure 16A:
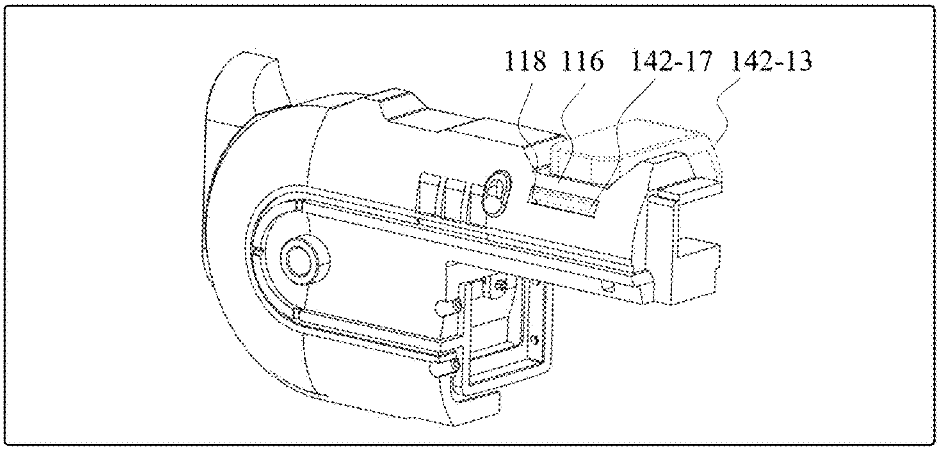
FIG. 16A is a schematic diagram of a engagement structure of a first shell and an execution body provided according to some exemplary embodiments of the present disclosure.
Figure 16B:
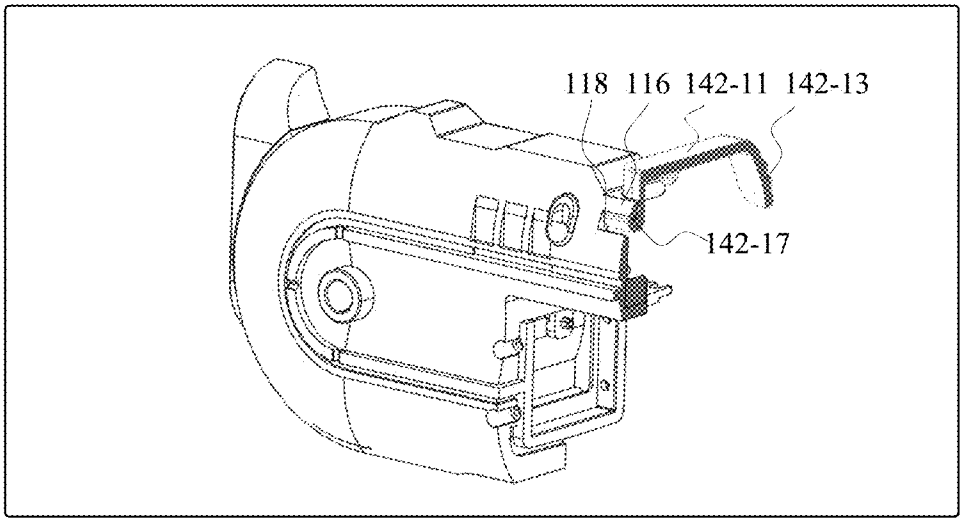
FIG. 16B is a cross-sectional schematic diagram of the engagement structure of the first shell and the execution body in FIG. 16A.

FIG. 16A is a schematic diagram of a engagement structure of a first shell 110 and an execution body 142-1 provided according to some exemplary embodiments of the present disclosure. FIG. 16B is a cross-sectional schematic diagram of the engagement structure of the first shell 110 and the execution body 142-1 in FIG. 16A. In the event that the second triggering surface 142-13 is triggered, the limiting member 116 provided by the first shell 110 and the first rotation limiting portion 142-17 of the execution body 142-1 are mated with each other. Specifically, the limiting lug 116 provided by the first shell 110 is in the shape of a shaft, and the first rotation limiting portion 142-17 is in a rotary shape capable of being mated with the shaft, and the limiting lug 116 in the shape of the shaft is mated with the first rotation limiting portion 142-17 in the rotary shape so that the rotation of the execution body 142-1 relative to the connecting piece 142-3 can be limited. For example, a hole 118 may also be formed between the limiting lug 116 in the shape of the shaft and other portion of the first shell 110. The first rotation limiting portion 142-17 in the rotary shape is capable of extending into the hole 118 to increase a contact area between the first rotation limiting portion 142-17 and the limiting lug 116, thereby improving the limiting stability.

It will be understood that in other embodiments, the first rotation limiting portion 142-17 included in the execution body 142-1 is in the shape of a shaft, and the limiting lug 116 provided by the first shell 110 is in a rotary shape capable of being mated with the shaft. The rotation limiting portion in the shape of the shaft is mated with the limiting lug 116 in the rotary shape so that the rotation of the execution body 142-1 relative to the connecting piece 142-3 can be limited.

Figure 17:
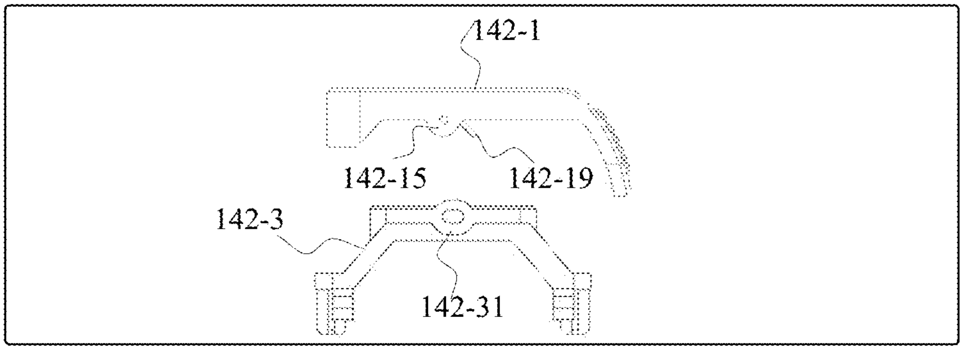
FIG. 17 is a structural schematic diagram of a rotation limiting portion provided according to another embodiment of the present disclosure.

FIG. 17 is a structural schematic diagram of a second rotation limiting portion 142-17' provided according to another embodiment of the present disclosure. With reference to FIG. 17, the second rotation limiting portion 142-17' of the execution body 142-1 may be disposed on a side of the rotational connection portion 142-15. In the event that the second triggering surface 142-13 is triggered, the relative rotation between the execution body 142-1 and the connecting piece 142-3 is limited by the second rotation limiting portion 142-17', thereby achieving the purpose of causing the connecting piece 142-3 to move in the first direction D1. In some embodiments, the execution body 142-1 may be of an integrally formed structure, where the second rotation limiting portion 142-17' serves as a portion of the integrally formed execution body 142-1. The second rotation limiting portion 142-17' may also be detachably connected to other parts of the execution body 142-1. Angles between the second rotation limiting portion 142-17' and other parts of the execution body 142-1 are adjustable to improve the control flexibility. It will be understood that the relative angles between the second rotation limiting portion 142-17' and other parts of the execution body 142-1 may be set according to actual requirements, which will not be defined herein.

The foregoing embodiments show the embodiments of rotational connection between the execution body 142-1 and the connecting piece 142-3. In other embodiments, the movable connection between the execution body 142-1 and the connecting piece 142-3 may also be implemented by a sliding connection.

Figure 18A:
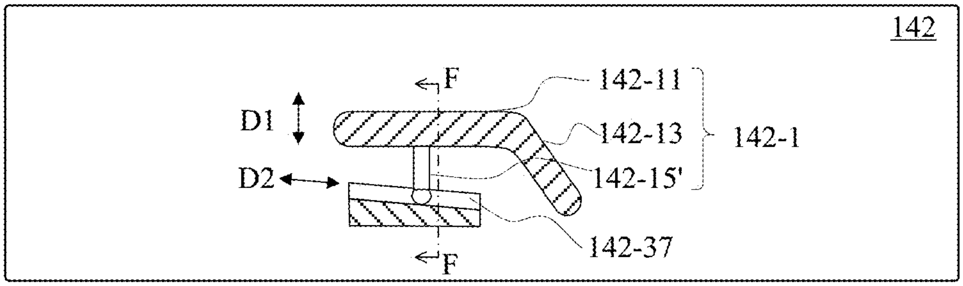
FIG. 18A is a structural schematic diagram of a sliding connection between an execution body and a connecting piece provided according to some exemplary embodiments of the present disclosure.
Figure 18B:
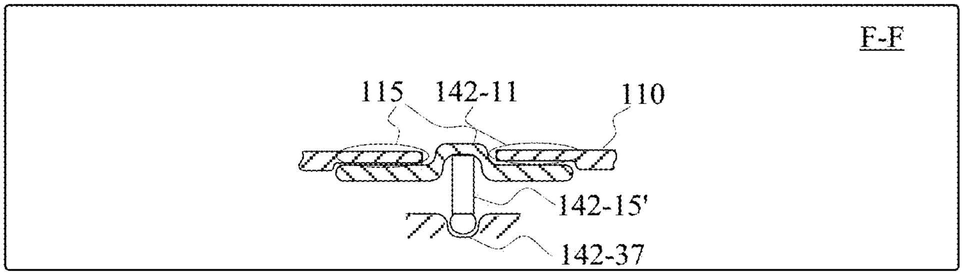
FIG. 18B is a cross-sectional schematic diagram F-F of FIG. 18A.

FIG. 18A is a structural schematic diagram of a sliding connection between an execution body 142-1 and a connecting piece 142-3 provided according to some exemplary embodiments of the present disclosure. FIG. 18B is a cross-sectional schematic diagram F-F of FIG. 18A. The execution body 142-1 may include a first triggering surface 142-11, a second triggering surface 142-13, and a sliding connection portion 142-15'. Meanwhile, the connecting piece 142-3 includes a slidable-match portion 142-37. The second triggering surface 142-13 is inclined at an included angle toward the tape 120 relative to the first triggering surface 142-11. The included angle may be an acute, a right angle, or an obtuse angle. Specifically, the slidable-match portion 142-37 is mated with the sliding connection portion 142-15' such that the execution body 142-1 is in sliding connection with the connecting piece 142-3 in a second direction D2, where the second direction D2 is not perpendicular to the first direction D1. For example, an acute included angle between the second direction D2 and the first direction D1 is 87°. That is, relative to the first triggering surface 142-11, a bottom surface of the slidable-match portion 142-37 has a certain angle of inclination. For example, relative to the first triggering surface 142-11, the angle of inclination of the bottom surface of the slidable-match portion 142-37 is in a range of (0°, 10°]. It will be understood that a reading of the angle of inclination may be determined according to an actual situation, which will not be defined herein. Specifically, the slidable-match portion 142-37 may be of a grooved structure for guiding the sliding connection portion 142-15'. With reference to FIG. 18B, the first shell 110 may further include a sliding limiting portion 115. In the event that the second triggering surface 142-13 is triggered, the sliding limiting portion 115 is configured to limit the movement of the execution body 142-1 away from the first shell 110 in the first direction D1.

In some embodiments, when the first triggering surface 142-11 is trigged, the execution body 142-1 drives, by means of the sliding connection, the connecting piece 142-3 to move in the first direction D1. When the second triggering surface 142-13 is triggered, in case of no sliding limiting portion 115 provided, the execution body 142-1 will slide in the second direction D2 relative to the connecting piece 142-3. Herein, when the second triggering surface 142-13 is triggered, limited by the sliding limiting portion 115, the execution body 142-1 is restricted by the sliding limiting portion 115 to move in the first direction D1 away from the tape 120 such that the execution body 142-1 drives the connecting piece 142-3 to move in the first direction D1 toward the tape 120. That is, the execution body 142-1 is capable of driving the connecting piece 142-3 to move in the first direction D1 toward the tape 120. As can be seen, in the event that any triggering surface of the execution body 142-1 is triggered, the connecting piece 142-3 can move in the first direction D1, thereby ensuring the stability of control on the tape 120.

Figure 19A:
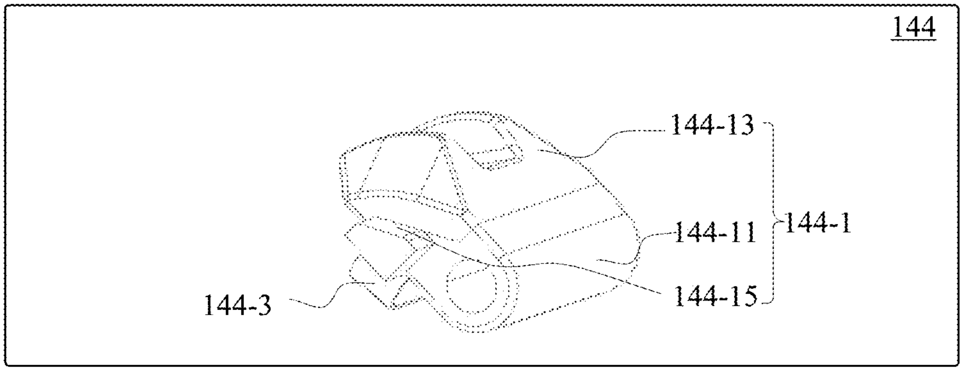
FIG. 19A is a structural schematic diagram of a braking component provided according to some exemplary embodiments of the present disclosure at an angle of view.
Figure 19B:
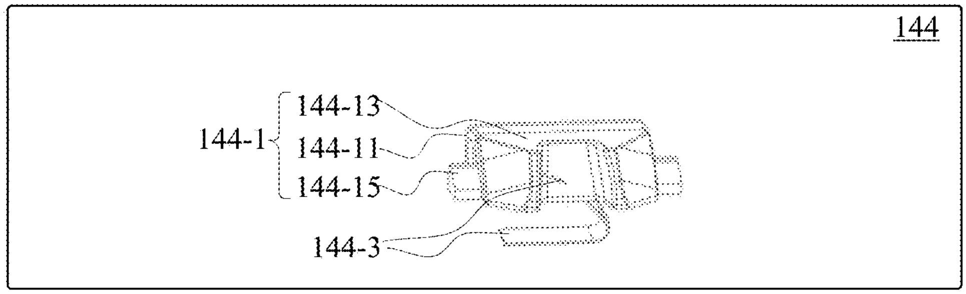
FIG. 19B is a structural schematic diagram of the braking component provided according to the embodiment of the present disclosure at another angle of view.

FIG. 19A and FIG. 19B are structural schematic diagrams of the braking component 144 provided according to some exemplary embodiments of the present disclosure at different angles of view, respectively. The braking component 144 and the execution component 142 may be located on two sides of the tape 120, respectively. With reference to FIG. 19A and FIG. 19B, the braking component 144 may include a first braking body 144-1 and an elastic driving body 144-3. The first braking body 144-1 may include a connecting portion 144-11, a braking portion 144-13, and a control portion 144-15.

With reference to FIG. 19B, the elastic driving body 144-3 may be V-shaped, and has one end connected to the first shell 110 and the other end connected to the first braking body 144-1. The elastic driving body 144-3 may also be a spiral spring, and has one end fixed to the first shell 110 and the other end connected to the first braking body 144-1. In the event that the braking component 144 and the execution component 142 are located on two sides of the tape 120, respectively. If both triggering surfaces are not triggered, the elastic driving body 144-3 made of an elastic material may cause the first braking body 144-1 to come into contact with the tape 120 under the driving by an elastic force of the elastic driving body 144-3, thereby realizing braking of the tape 120.

In some embodiments, the first braking body 144-1 may be movably connected to the first shell 110. For example, with reference to FIG. 19A, the first braking body 144-1 is provided with a hole so that the movable connection of a rotation type between the first braking body 144-1 and the first shell 110 can be realized by shaft connection. The first braking body 144-1 may also be in the movable connection of a sliding type with the first shell 110. For example, the first shell 110 is provided with a slot, and the first braking body 144-1 may be a key to be mated with the slot. By key-slot engagement/coupling, the first braking body 144-1 is capable of sliding relative to the first shell 110. The connecting portion 144-11 may be made of an unelastic material to ensure the flexibility of the movable connection.

The elastic driving body 144-3 has one end connected to the first shell 110 and the other end capable of being connected to the first braking body 144-1. Specifically, in the event that any triggering surface of the execution body 142-1 is triggered, the braking component 144 receives driving from the connecting piece 142-3. Further, since the movable connection between the connecting portion 144-11 of the braking component 144 and the first shell 110 is realized by shaft connection and the elastic driving body 144-3 for supporting the first braking body 144-1 is made of an elastic material, the braking component 144 is capable of releasing the tape 120 under the driving.

In some embodiments, with reference to FIG. 19A, the braking portion 144-13 may be in fixed connection (e.g., adhesive connection) with the connecting portion 144-11. In the event that the triggering surface is not triggered, under the supporting action of the elastic driving body 144-3, the braking portion 144-13 is in the contact state with the tape 120. A frictional force between the braking portion 144-13 and the tape 120 may play a role in braking the tape 120.

In some embodiments, with reference to FIG. 19A and FIG. 19B, the control portion 144-15 may be fixed to the connecting portion 144-11. In the event that the triggering surface is triggered, in the process that the connecting piece 142-3 is driven by the execution body 142-1 to move in the first direction D1, the driving portion 142-35 will come into contact with the control portion 144-15 and transfer a driving force. Specifically, under the driving action of the driving portion 142-35, the control portion 144-15 will compress the elastic driving body 144-3, thereby driving the first braking body 144-1 to move away from the tape 120. Thus, the contact state between the braking portion 144-13 and the tape 120 gradually transitions to the separate state. The tape 120 then is transitioned from the braked state to the non-braked state.

Figure 20:
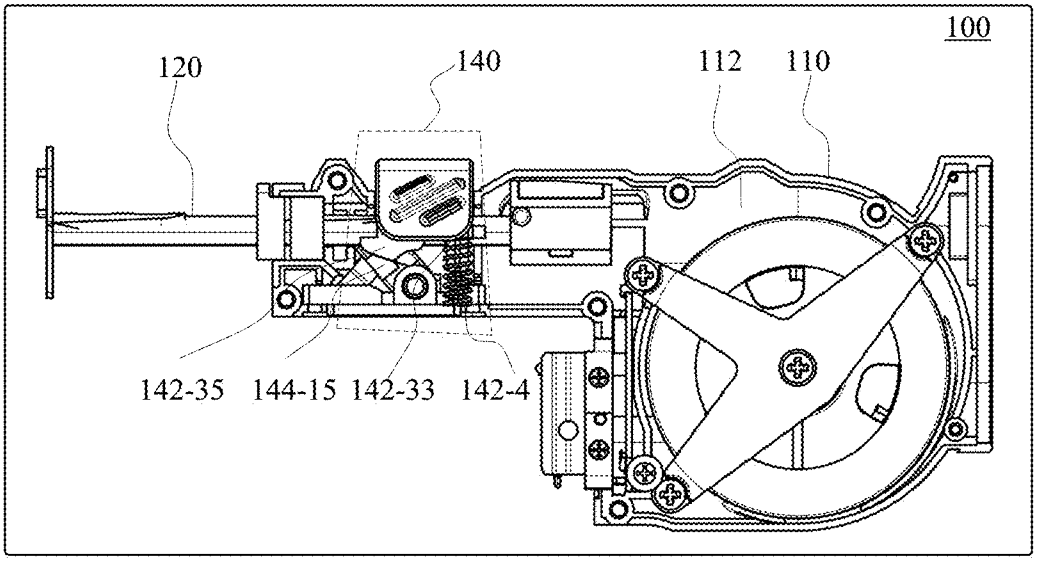
FIG. 20 is a structural schematic diagram of a tape measure provided according to one embodiment of the present disclosure.

FIG. 20 is a structural schematic diagram of a tape measure 100 provided according to one embodiment of the present disclosure. With reference to FIG. 20, the tape measure 100 includes a braking component as shown in FIG. 19A and FIG. 19B. The braking component 144 and the execution component 142 are located on two sides of the tape 120, respectively. When both of the first triggering surface 142-11 and the second triggering surface 142-13 are not triggered, the braking component is in contact with the tape 120 to realize the braking of the tape 120. When any one of the first triggering surface 142-11 and the second triggering surface 142-13 is triggered, the execution component presses against the braking component and drives the braking component to be separated from the tape 120 to release the tape 120. Specifically, when the two triggering surfaces of the execution body 142-1 are not triggered, the first braking body 144-1 comes into contact with the tape 120 under the action of an elastic force of the elastic driving body 144-3, and a frictional force between the braking portion 144-13 and the tape 120 causes the tape 120 to be in the braked state. Meanwhile, under the supporting action of the elastic supporting portion 142-4, the connecting piece 142-3 is in a state of not contacting the braking component 144, guaranteeing that the tape 120 is successfully braked. When any triggering surface of the execution body 142-1 is triggered, the connecting piece 142-3 is driven by the execution body 142-1 to move in the first direction D1, where the driving portion 142-35 presses against the control portion 144-15 of the braking component 144, thereby compressing the elastic driving body 144-3 to drive the first braking body 144-1 to move away from the tape 120. Thus, the contact state between the braking portion 144-13 and the tape 120 gradually transitions to the separate state, and the tape 120 is transitioned from the braked state to the non-braked state.

Figure 21:
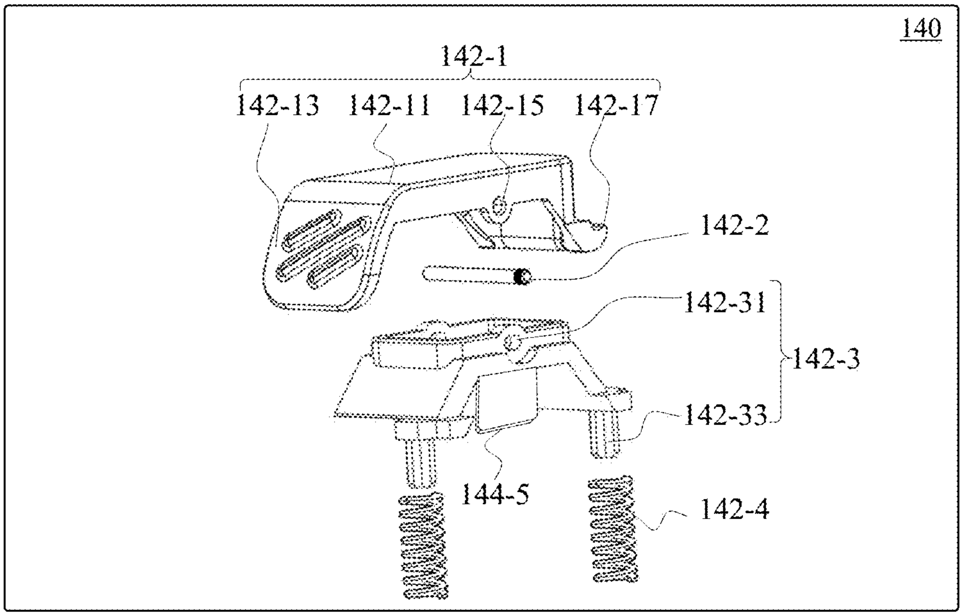
FIG. 21 is a structural schematic diagram of a brake assembly provided according to another embodiment of the present disclosure.

FIG. 21 is a structural schematic diagram of a brake assembly 140 provided according to another embodiment of the present disclosure. Unlike the brake assembly 140 provided in the foregoing embodiment, the connecting piece 142-3 may include only the rotational engagement portion 142-31 and the guiding portion 142-33; and the braking component includes a second braking body 144-5 shown in FIG. 21. The second braking body 144-5 is connected to the connecting piece 142-3 and disposed between a group of guiding portions 142-33.

Specifically, the braking component 144 and the execution component 142 are located on a same side of the tape 120. When the two triggering surfaces of the execution body 142-1 are not triggered, under the supporting action of the elastic supporting portion 142-4, the second braking body 144-5 connected to the connecting piece 142-3 is in the separate state from the tape 120, i.e., the tape 120 is not in the braked state. When any triggering surface of the execution body 142-1 is triggered, the connecting piece 142-3 is driven by the execution body 142-1 to move in the first direction D1. The second braking body 144-5 connected to the connecting piece 142-3 moves toward the tape 120 and gradually presses against the tape 120, thereby realizing the braking of the tape 120.

Figure 22:
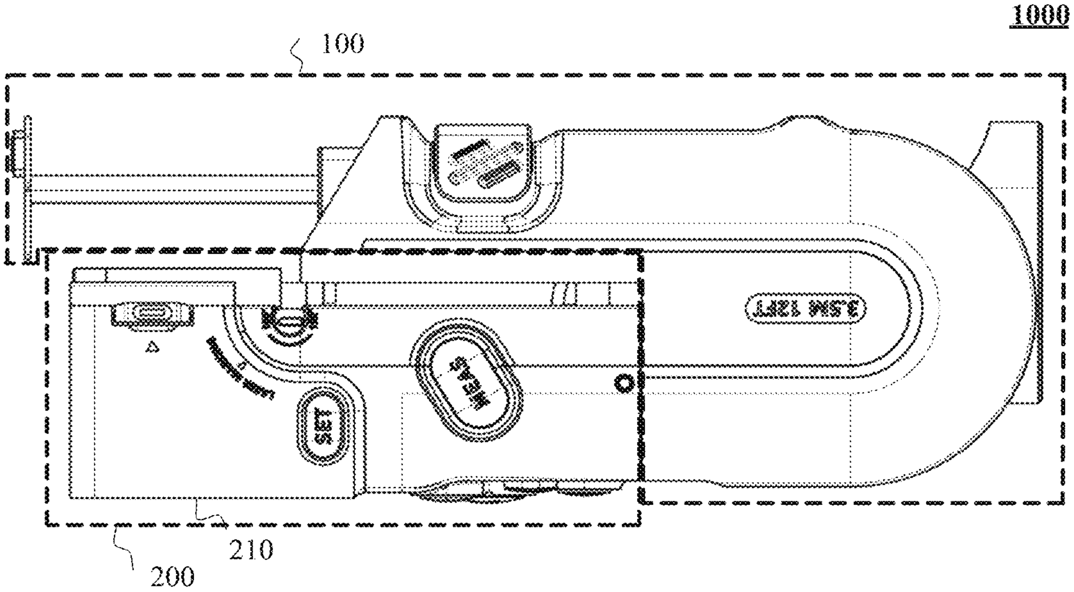
FIG. 22 is a structural schematic diagram of a measuring device provided according to some exemplary embodiments of the present disclosure.

FIG. 22 is a structural schematic diagram of a measuring device 1000 provided according to some exemplary embodiments of the present disclosure. The measuring device 1000 may include the tape measure 100 provided in the foregoing embodiments and a laser ranging device 200 connected to the tape measure 100. In some embodiments, the measuring device 1000 may further include a marking assembly (not shown in FIG. 22). The tape measure 100 may be configured to measuring short distances. For example, a distance within 5 m may be measured by the tape 120 of the tape measure 100. The laser ranging device 200 may conveniently realize long-distance (e.g., 100-meter scale) measurement by emitting ranging laser, thus making up for the shortcoming that the tape measure 100 is not suitable for long-distance measurement. As can be seen, the measuring device 1000 provided herein can be applied in broad application scenarios and has high practicability.

Figure 23:
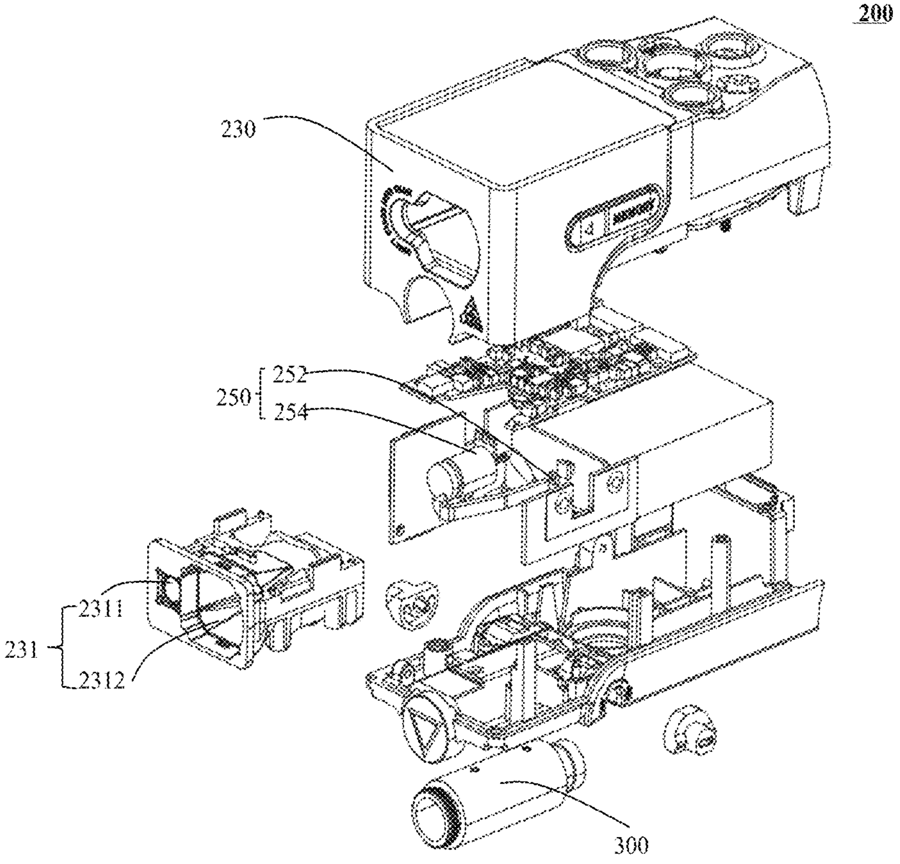
FIG. 23 is an exploded diagram of a laser ranging device provided according to some exemplary embodiments of the present disclosure.

FIG. 23 is an exploded diagram of a laser ranging device 200 provided according to some exemplary embodiments of the present disclosure. The laser ranging device 200 may include a second shell 230 and a laser measuring portion 250. In some embodiments, the marking assembly 300 may be disposed on the laser ranging device 200.

The second shell 230 may be a mounting base of the laser ranging device 200. The second shell 230 may be provided with a second outlet 231. The second outlet 231 may include an emitting port 2311 and a receiving port 2312. The emitting port 2311 and the receiving port 2312 may be disposed in parallel. The laser measuring portion 250 may be disposed in the second shell 230, and may, during working, measure a distance in a second measuring direction through the second outlet 231. Specifically, the laser measuring portion 250 may include an emitter 252 and a receiver 254. During working, the emitter 252 emits ranging laser through the emitting port 2311 to a target object/obstacle, and the ranging laser is reflected off the target object and passes through the receiving port 2312 to be received by the receiver 254. A distance between the target object and an origin of measurement is then determined from a time difference between the emission and the reception of the ranging laser.

In some embodiments, the tape measure 100 and the laser ranging device 200 may be detachably connected, thereby facilitating replacement of one of them that is damaged to affect the use. Specifically, the tape measure 100 may include a first connection portion 180. The first connection portion 180 may be connected to the first shell 110. The laser ranging device 200 may include a second connection portion 240. The second connection portion may be connected to the second shell 230. The tape measure 100 and the laser ranging device 200 may be detachably connected by the first connection portion 180 and the second connection portion 240 such that the tape measure 100 is mated with the laser ranging device 200 to realize distance measurements in different ways. The different ways may include different directions and/or different measuring ranges.

When the measuring directions of the tape measure 100 and the laser ranging device 200 are different, the tape measure 100 may match the laser ranging device 200 to realize measurements in different directions. When the measuring ranges of the tape measure 100 and the laser ranging device 200 are different, the tape measure 100 is mated with the laser ranging device 200 to realize measurements of different measuring ranges. When the measuring directions and the measuring ranges of the tape measure 100 and the laser ranging device 200 are different, the tape measure 100 may match the laser ranging device 200 to realize measurements of different measuring ranges in different directions.

Figure 24A:
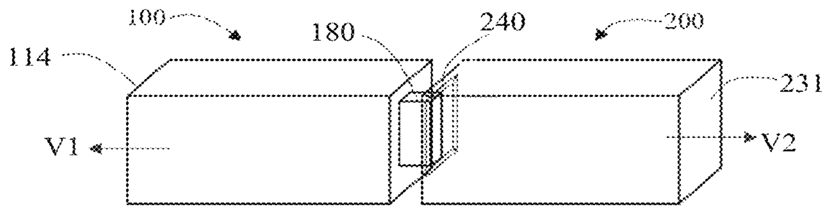
FIG. 24A is a schematic diagram of different measuring directions when a tape measure is connected to a laser ranging device provided according to some exemplary embodiments of the present disclosure.
Figure 24B:
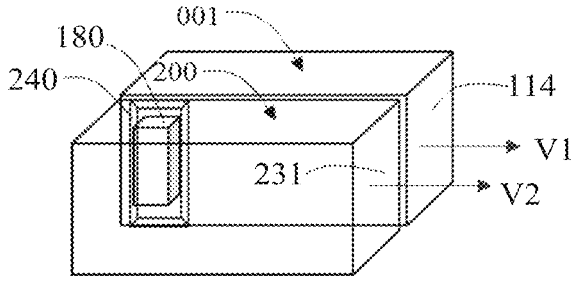
FIG. 24B is a schematic diagram of a same measuring direction when the tape measure is connected to the laser ranging device provided according to some exemplary embodiments of the present disclosure.
Figure 24C:
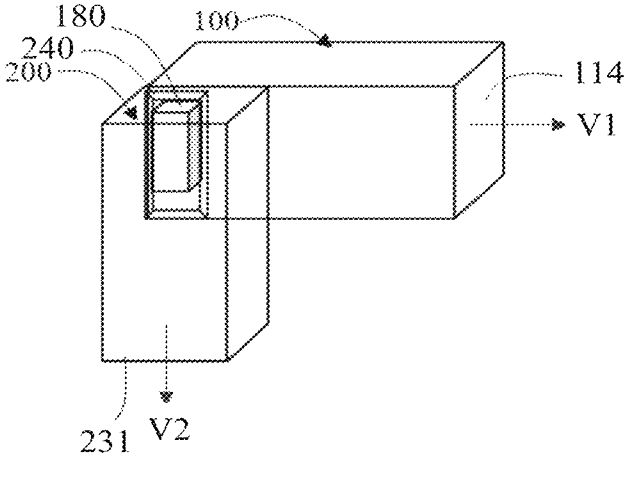
FIG. 24C is a schematic diagram of perpendicular measuring directions when the tape measure is connected to the laser ranging device provided according to some exemplary embodiments of the present disclosure.

FIG. 24A to FIG. 24C are schematic diagrams of different measuring directions when a tape measure 100 is connected to the laser ranging device 200 provided according to some exemplary embodiments of the present disclosure. As shown in FIG. 24A to FIG. 24C, for ease of description, we define the measuring directions of the tape measure 100 and the laser ranging device 200 as follows. The tape measure 100 may measure a distance in a first measuring direction V1 through the first outlet 114. The laser ranging device 200 may measure a distance in a second measuring direction V2 through the second outlet 231. The first measuring direction V1 and the second measuring direction V2 may be the same or different. The measuring range in the first measuring direction V1 and the measuring range in the second measuring direction V2 may be the same or different.

As shown in FIG. 24A, when the tape measure 100 is connected to the laser ranging device 200, the first outlet 114 of the tape measure 100 and the second outlet 231 of the laser ranging device 200 may be located on two sides of the first connection portion 180 and the second connection portion 240. The first measuring direction V1 may be opposite to the second measuring direction V2.

As shown in FIG. 24A, when the tape measure 100 is connected to the laser ranging device 200, the first outlet 114 of the tape measure 100 and the second outlet 231 of the laser ranging device 200 may be located on a same side of the first connection portion 180 and the second connection portion 240. In this case, the first measuring direction V1 may be the same as the second measuring direction V2.

As shown in FIG. 24C, when the tape measure 100 is connected to the laser ranging device 200, the first outlet 114 of the tape measure 100 and the second outlet 231 of the laser ranging device 200 may be disposed perpendicularly. In this case, the first measuring direction V1 may be perpendicular to the second measuring direction V2.

It needs to be noted that the first measuring direction V1 may be substantially the same as, opposite to, or perpendicular to, or may be roughly the same as, opposite to, or perpendicular to the second measuring direction V2. That is, a certain error is allowed. The magnitude of the error is related to the precision of the tape measure 100 and the laser ranging device 200.

It needs to be noted that FIG. 24A to FIG. 24C merely exemplarily show a relationship between the first measuring direction V1 and the second measuring direction V2. The relationship between the first measuring direction V1 and the second measuring direction V2 not only includes the above three cases, but also any angle formed therebetween, such as an acute angle and an obtuse angle. For example, the angle between the first measuring direction V1 and the second measuring direction V2 may be 30°, 60°, and 120°, and even other angles, etc., which will not be defined herein.

In some embodiments, the first connection portion 180 may be movably connected to the first shell 110, and/or the second connection portion 240 may be rotationally connected to the second shell 230. For example, the rotational connection allows the included angle between the first measuring direction V1 and the second measuring direction V2 to be adjusted. Thus, any angle may be formed between the first measuring direction V1 and the second measuring direction V2, thereby meeting the use requirements and expanding the use scenarios. For example, the included angle between the first measuring direction V1 and the second measuring direction V2 may be adjusted between 0° and 360°. The rotational connection may be implemented in many ways, such as hinged connection with damping and hinged connection by a ratchet wheel.

The detachable connection of the tape measure 100 and the laser ranging device 200 is achieved by connecting the first connection portion 180 on the tape measure 100 with the second connection portion 240 on the laser ranging device 200.

Figure 25A:
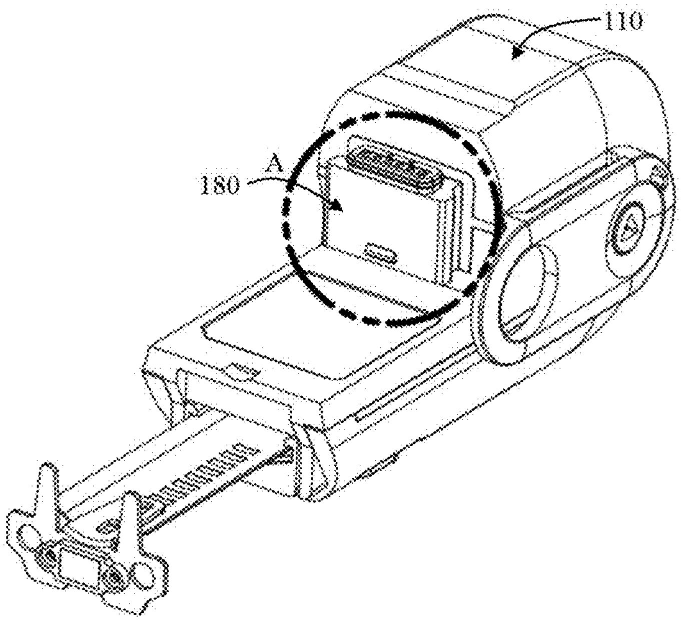
FIG. 25A is a structural schematic diagram of the tape measure shown in FIG. 22 according to the present disclosure.
Figure 25B:
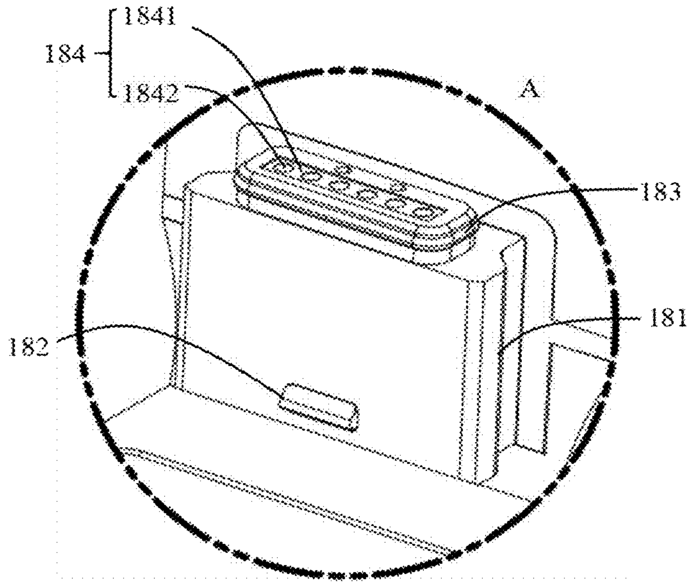
FIG. 25B is an enlarged view of area A of the tape measure shown in FIG. 25A according to the present disclosure.
Figure 26A:
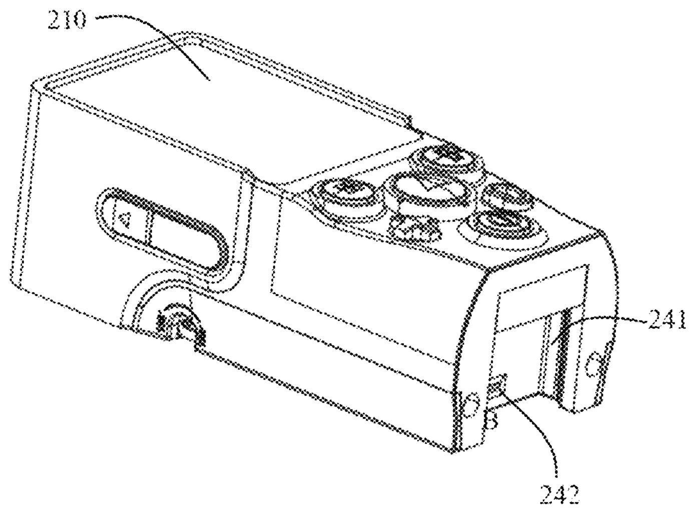
FIG. 26A is a structural schematic diagram of the laser ranging device shown in FIG. 22 according to the present disclosure at a first angle of view.
Figure 26B:
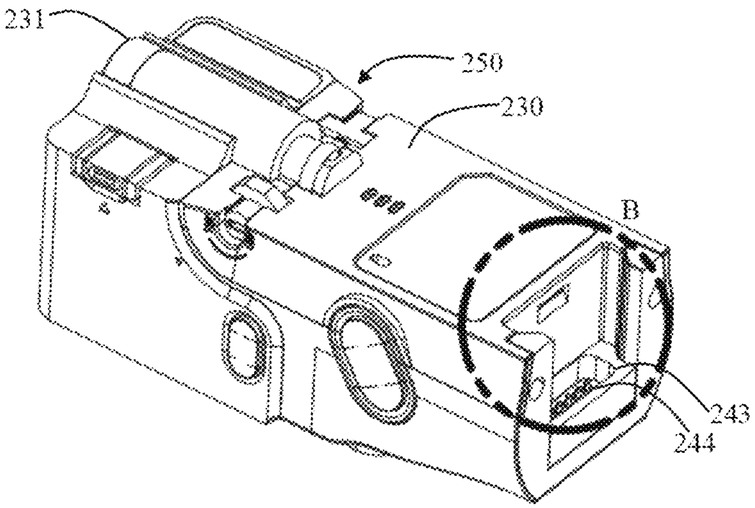
FIG. 26B is a structural schematic diagram of the laser ranging device shown in FIG. 22 according to the present disclosure at a second angle of view.
Figure 26C:
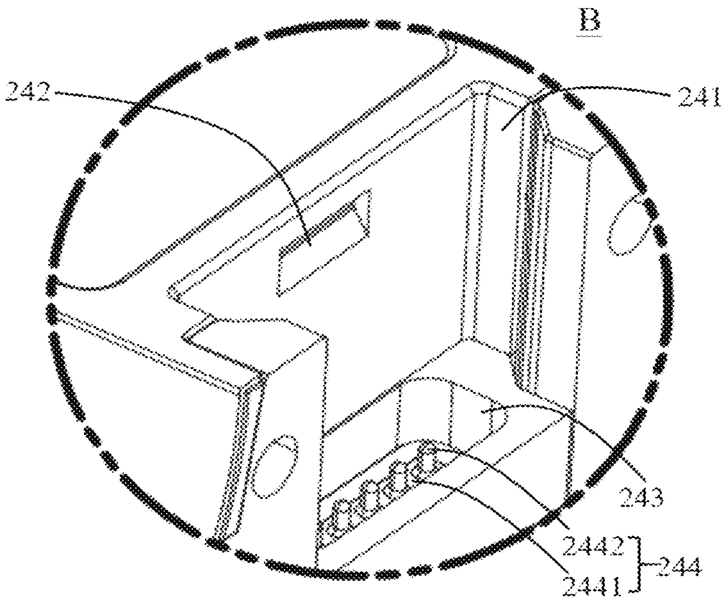
FIG. 26C is an enlarged view of area B of the laser ranging device shown in FIG. 26B according to the present disclosure.

FIG. 25A is a structural schematic diagram of the tape measure 100 shown in FIG. 22 according to the present disclosure; FIG. 25B is an enlarged view of area A of the tape measure 100 shown in FIG. 25A according to the present disclosure; FIG. 26A is a structural schematic diagram of the laser ranging device 200 shown in FIG. 22 according to the present disclosure at a first angle of view; FIG. 26B is a structural schematic diagram of the laser ranging device 200 shown in FIG. 22 according to the present disclosure at a second angle of view; and FIG. 26C is an enlarged view of area B of the laser ranging device 200 shown in FIG. 26B according to the present disclosure.

As shown in FIG. 25A to FIG. 26C, one of the first connection portion 180 and the second connection portion 240 may include a first connecting mechanism 181, and the other one may include a second connecting mechanism 241. In some embodiments, one of the first connection portion 180 and the second connection portion 240 may further include a clamping slot 242, and the other one may further include a spring clamping point 182.

The second connecting mechanism 241 may be disposed on the second connection portion 240, and the first connecting mechanism 181 may be disposed on the first connection portion 180. The second connecting mechanism 241 may also be disposed on the first connection portion 180, and the first connecting mechanism 181 may be disposed on the second connection portion 240. The clamping slot 242 may be disposed on the second connection portion 240, and the spring clamping point 182 may be disposed on the first connection portion 180. The clamping slot 242 may also be disposed on the first connection portion 180, and the spring clamping point 182 may be disposed on the second connection portion 240. For ease of showing, we will make the following description by taking for example that the second connecting mechanism 241 is disposed on the second connection portion 240, the first connecting mechanism 181 disposed on the first connection portion 180, the clamping slot 242 disposed on the second connection portion 240, and the spring clamping point 182 disposed on the first connection portion 180. Those skilled in the art will understand that other cases also fall into the protection scope of the present disclosure.

The second connecting mechanism 241 may be a slot extending in a sliding direction. The first connecting mechanism 181 may be slidably connected to the second connecting mechanism 241 in the sliding direction. The second connecting mechanism 241 may match the first connecting mechanism 181. The matching may be matching between shapes and sizes of engaging surfaces of the second connecting mechanism 241 and the first connecting mechanism 181. For example, the second connecting mechanism 241 may be a fixed connecting groove, and the first connecting mechanism 181 may be a connecting lug boss. When the second connecting mechanism 241 is mated with the first connecting mechanism 181, the second connecting mechanism 241 plays a guiding role so that the first connecting mechanism 181 can slide in an extension direction (i.e., the sliding direction) of the second connecting mechanism 241. A cross-section shape of the second connecting mechanism 241 may be a triangle, a rectangle, a dovetail, a circle, etc. The extension direction of the second connecting mechanism 241 may be any direction. The extension direction of the second connecting mechanism 241 shown in FIG. 25A to FIG. 26C is merely an exemplary direction. Those skilled in the art will understand that it still falls into the protection scope of the present disclosure when the extension direction of the second connecting mechanism 241 is other directions. For example, the extension direction is a same direction as the first measuring direction V1. For another example, the extension direction is any direction perpendicular to the first measuring direction V1, and so on.

When the first connecting mechanism 181 slides along the second connecting mechanism 241 to a specified position, the spring clamping point 182 may be clamped into the clamping slot 242. The clamping slot 242 may match the spring clamping point 182. The matching may be matching between shapes and sizes of engaging surfaces of the spring clamping point 182 and the clamping slot 242. When the first connection portion 180 is connected to the second connection portion 240, the first connecting mechanism 181 is slidably connected to the second connecting mechanism 241 in the sliding direction until the spring clamping point 182 is clamped into the clamping slot 242, so as to realize fixed connection of the first connection portion 180 and the second connection portion 240. The matching of the spring clamping point 182 with the clamping slot 242 may cause the first connection portion 180 and the second connection portion 240 to be fixed relatively in the sliding direction, thereby realizing reliable connection of the first connection portion 180 and the second connection portion 240. The coupling surfaces of the clamping slot 242 and the spring clamping point 182 are wedge-shaped surfaces in the sliding direction. For example, the coupling surfaces of the clamping slot 242 and the spring clamping point 182 in the sliding direction are trumpet-shaped. In this way, when the first connection portion 180 and the second connection portion 240 are connected, the spring clamping point 182 can be clamped into the clamping slot 242 rapidly and accurately by means of the trumpet-shaped inclined surfaces; and when the first connection portion 180 and the second connection portion 240 are detached, the spring clamping point 182 can be disengaged from the clamping slot 242 rapidly and readily by means of the trumpet-shaped inclined surfaces.

When the first connection portion 180 and the second connection portion 240 are connected, the first connecting mechanism 181 is clamped into the second connecting mechanism 241 and slides in the sliding direction relative to the second connecting mechanism 241 to a specified position, and then the spring clamping point 182 is clamped into the clamping slot 242. When the first connection portion 180 and the second connection portion 240 are detached, as the second connection portion 240 moves in the sliding direction under the action of an external force, a pressure is produced by the wedge-shaped surface on the spring clamping point 182 such that the spring clamping point 182 is compressed and thus disengaged from the clamping slot 242, causing the first connection portion 180 and the second connection portion 240 to move relatively in the sliding direction until they are disengaged from each other.

As described previously, the optical positioning assembly 140, the imaging sensor 132, and the position identification sensor 134 may be disposed in the tape measure 100 to read an extension length of the tape. The first controller 150 may calculate, based on the data detected by the optical positioning assembly 140, a distance, i.e., first measurement data, measured by the tape 120. In this case, the first measurement data measured by the tape measure 100 needs to be output through the output assembly. The output assembly may be an output device and/or an output interface. Second measurement data measured by the laser ranging device 200 also needs to be output through the output assembly. In this case, the laser ranging device 200 may include a second controller. The second controller may be electrically connected to the laser ranging device 200 to generate the second measurement data measured by the laser ranging device 200.

When the tape measure 100 is connected to the laser ranging device 200, the tape measure 100 and the laser ranging device 200 may have their own independent output assemblies, or may share a same output assembly. When the tape measure 100 and the laser ranging device 200 share one output assembly, one of the tape measure 100 and the laser ranging device 200 may include the output assembly. In this case, when the tape measure 100 is connected to the laser ranging device 200, the output assembly may output the first measurement data measured by the tape measure 100 and/or the second measurement data measured by the laser ranging device 200. As shown in FIG. 26A, we show the output assembly 210 as being disposed on the laser ranging device 200 for example. Those skilled in the art will understand that the output assembly 210 being disposed on the tape measure 100 also falls into the protection scope of the present disclosure.

When the tape measure 100 is connected to the laser ranging device 200, to enable the output assembly 210 to output both of the first measurement data and the second measurement data, the output assembly 210 needs to be electrically connected to both of the first controller 150 and the second controller to receive the first measurement data and the second measurement data from the first controller 150 and the second controller. In this case, one of the first connection portion 180 and the second connection portion 240 may further include a connector 184, and the other one may further include a connecting base 244. The connecting base 244 may be disposed on the second connection portion 240, and the connector 184 may be disposed on the first connection portion 180. The connecting base 244 may also be disposed on the first connection portion 180, and the connector 184 may be disposed on the second connection portion 240. For ease of showing, we will make the following description by taking for example that the connecting base 244 is disposed on the second connection portion 240 and the connector 184 disposed on the first connection portion 180. Those skilled in the art will understand that other cases also fall into the protection scope of the present disclosure.

One of the connector 184 and the connecting base 244 is electrically connected to the output assembly 210. The electrical connection may be a direct electrical connection or an indirect electrical connection. For example, the indirect electrical connection is realized by means of the first controller 150 or the second controller. For example, one of the connector 184 and the connecting base 244 that is located on a same device with the output assembly 210 is electrically connected to the output assembly 210.

The connector 184 located on the first connection portion 180 may be electrically connected to the first controller 150 to transmit data. The connecting base 244 located on the second connection portion 240 may be electrically connected to the second controller to transmit data. The connector 184 and the connecting base 244 may be configured to transmit data. When the connector 184 is in contact with the connecting base 244, current flows through the connector 184 and the connecting base 244 so that data in the connector 184 and data in the connecting base 244 may be transmitted mutually.

As shown in FIG. 26B, the connector 184 includes a connector housing 1841 eclectically connected to the first controller 150 and a plurality of uniformly distributed wiring terminals 1842 disposed in the connector housing 1841. As shown in FIG. 26C, the connecting base 244 includes a connecting base housing 2441 eclectically connected to the second controller and a plurality of uniformly distributed metal probes 2442. When the first connection portion 180 is connected to the second connection portion 240, the metal probes 2442 are in contact with the wiring terminals 1842 to realize electrical connection. The metal probes 2442 may be elastically connected to the connecting base housing 2441. When the first connection portion 180 is connected to the second connection portion 240, the wiring terminals 1842 are in contact with the metal probes 2442, and an elastic device of the metal probes 2442 is compressed such that the wiring terminals press against the metal probes to realize electrical connection.

The connector 184 and the connecting base 244 may be disposed at any positions of the first connection portion 180 and the second connection portion 240. An orientation in which the connector 184 is connected to the connecting base 244 may be any orientation. For example, the connector 184 and the connecting base 244 may be connected in the sliding direction, or may be connected in the first measuring direction V1, or may be connected in a direction perpendicular to the first measuring direction V1 and the sliding direction. When the first connection portion 180 is connected to the second connection portion 240, the connector 184 is electrically connected to the connecting base 244 so that both of the first controller 150 and the second controller can be electrically connected to the output assembly 210.

In some embodiments, to guarantee the reliability of connection between the connector 184 and the connecting base 244, one of the first connection portion 180 and the second connection portion 240 may further include a first positioning mechanism 183, and the other one may further include a second positioning mechanism 243. The connector 184 and the connecting base 244 are mounted on the first positioning mechanism 183 and the second positioning mechanism 243, respectively. The first positioning mechanism 183 matches the second positioning mechanism 243. For example, the first positioning mechanism 183 may be a positioning lug boss, and the second positioning mechanism 243 may be a positioning groove. When the tape measure 100 is connected to the laser ranging device 200, the first positioning mechanism 183 is clamped into the second positioning mechanism 243. The first positioning mechanism 183 and the second positioning mechanism 243 may be disposed in a direction in which the connector 184 is connected to the connecting base 244. For example, the first positioning mechanism 183 and the second positioning mechanism 243 may be disposed in the sliding direction.

Figure 27:
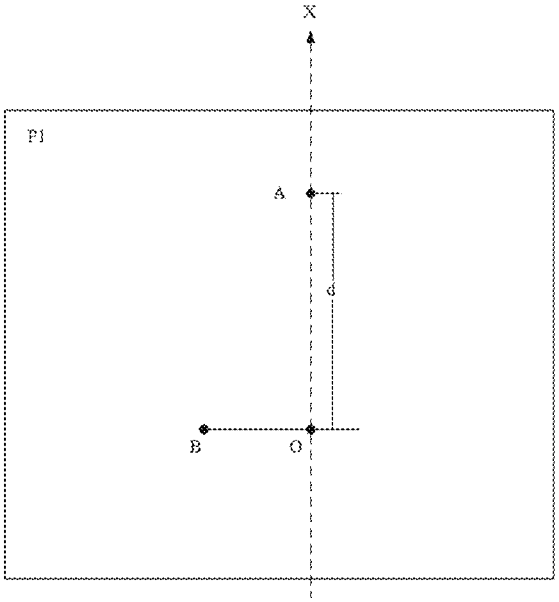
FIG. 27 is a schematic diagram of a target point and a reference point provided according to some exemplary embodiments of the present disclosure.

In some embodiments, the measuring device 1000 may further include the marking assembly 300. The marking assembly 300 may be mechanically connected to the tape measure 100 and/or the laser ranging device 200. When the marking assembly 300 is running, laser may be emitted along a marking plane to a target plane such that a laser marking passing through a reference point is irradiated by the laser in the target plane. The reference point may include a reference point during ranging by the tape measure 100 and/or the laser ranging device 200. FIG. 27 is a schematic diagram of a target point and a reference point provided according to some exemplary embodiments of the present disclosure.

By using the marking assembly 300, a user can measure a distance between two points in a specified direction. For example, the user may need to measure a distance d between point A (the target point) and point B (the reference point) on a wall P1 (target plane) in the X direction. The reference point B for the measurement starting point (i.e., origin O) is beyond the X direction, but located within a length of the laser marking, and the laser marking is capable of reaching the reference point B. Thus, the measurement origin O of measurement of the measuring device 1000 can be calibrated by the reference point B, and the distance d between the reference point B and the target point A in the X direction may be measure accurately by the distance between the origin O of measurement and the point A. The target plane P1 may be a substantial plane which is in contact with the bottom of the measuring device 1000 when the measuring device 1000 is measuring. The target plane P1 may also be a virtual plane needing to be determined by a user according to actual measurement when the measuring device 1000 is measuring. The reference point is located in the target plane P1. The target point may be located in the target plane P1, or may not be located in the target plane P1. During measurement, the target point may coincide with the origin of measurement/During measurement, the X direction may be the first measuring direction V1 of the tape measure 100, or may be the second measuring direction V2 of the laser ranging device 200.

The marking assembly 300 is described below by taking for example that the marking assembly 300 is mounted on the second shell 230 of the laser ranging device 200, the target point is located in the target plane P1, and the tape measure 100 is used for ranging (the reference point is a reference point for ranging by the tape measure 100/during measurement, the bottom of the tape measure 100 is in contact with the target plane P1).

Figure 28A:
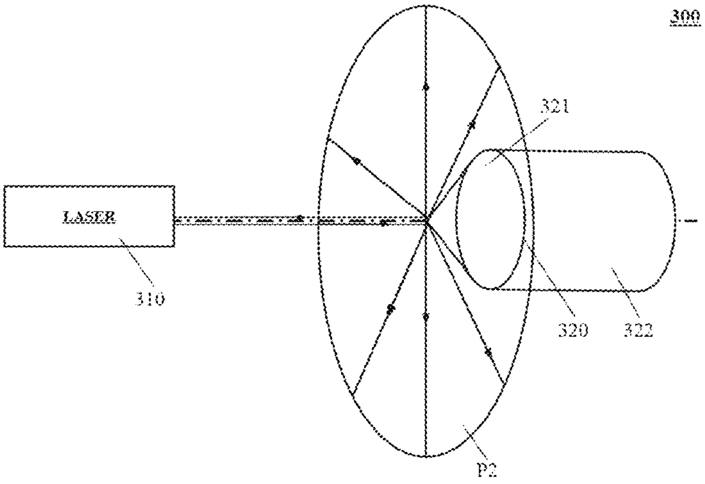
FIG. 28A is a diagram illustrating an internal working principle of a marking assembly provided according to some exemplary embodiments of the present disclosure.

FIG. 28A is a diagram illustrating an internal working principle of a marking assembly 300 provided according to some exemplary embodiments of the present disclosure.

Figure 28B:
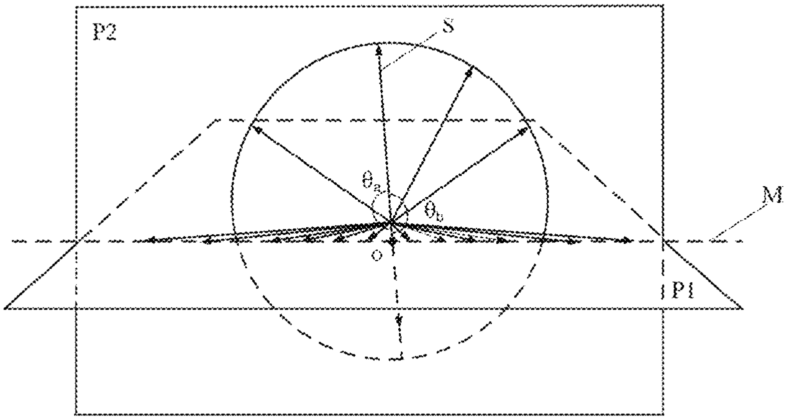
FIG. 28B is a schematic diagram of a laser marking provided according to some exemplary embodiments of the present disclosure.

FIG. 28B is a schematic diagram of a laser marking provided according to some exemplary embodiments of the present disclosure.

The marking assembly 300 may include a laser emitter 310 and a reflecting element 320 (shown in FIG. 28A). In some embodiments, the marking assembly 300 may further include a marking adjusting assembly 330 (not shown in FIG. 28A and FIG. 28B).

The laser emitter 310, when running, is capable of emitting laser to the reflecting element 320. The reflecting element 320 may include a reflecting surface 321. The reflecting surface 321 may be spaced apart from the laser emitter 310. The reflecting surface 321 receives the laser emitted by the laser emitter 310 and can reflect the laser along the marking plane P2, allowing the laser to cover a field of view (herein the field of view refers to the entire emission range of the laser). The reflecting surface 321 of the reflecting element 320 may include at least a portion of a conical surface. A cone angle of the conical surface may be 90° such that the laser reflected by the conical surface is in the same plane.

The reflecting surface 321 of the reflecting element 320 may include at least a portion of the conical surface. The reflecting surface 321 may be a complete circular conical surface, as shown in FIG. 28A. The laser emitter 310, when working, emits laser to a vertex of the reflecting surface 321. Under the action of the circular conical surface, the laser forms an initial laser plane spreading 360° around. If the cone angle of the reflecting surface is 90°, the initial laser plane is a plane. As shown in FIG. 28B, in effect, due to the existence of the target plane P1, after the laser emitted by the laser emitter 310 is reflected to the marking plane P2, part of the reflected laser may propagate to the target plane P1, and a laser marking M is irradiated in the target plane P1. Since a 360° laser plane is obtained by reflecting by the reflecting surface 321, there is a point at infinity, from which the laser can irradiate to the target plane P1, in the laser plane. Thus, the laser marking M in the target plane P1 has an infinite length. An axis of the conical surface may be parallel to the target plane P1, and the laser is incident along the axis of the conical surface such that the marking plane P2 of the reflected laser is perpendicular to the target plane P1. A half field angle is any one of two angles obtained by segmenting a field angle by the laser passing through the origin. As shown in FIG. 28B, the laser s passing through the origin in the marking plane P2, the 360° laser plane may be divided into two angles, which are $\theta_a$ and $\theta_b$, respectively. The half field angle may be any angle of $\theta_a$ and $\theta_b$. The reflecting surface 321 may be part of a circular conical surface. The specific application that the reflecting surface is part of a conical surface will be set forth hereinafter.

Figure 29A:
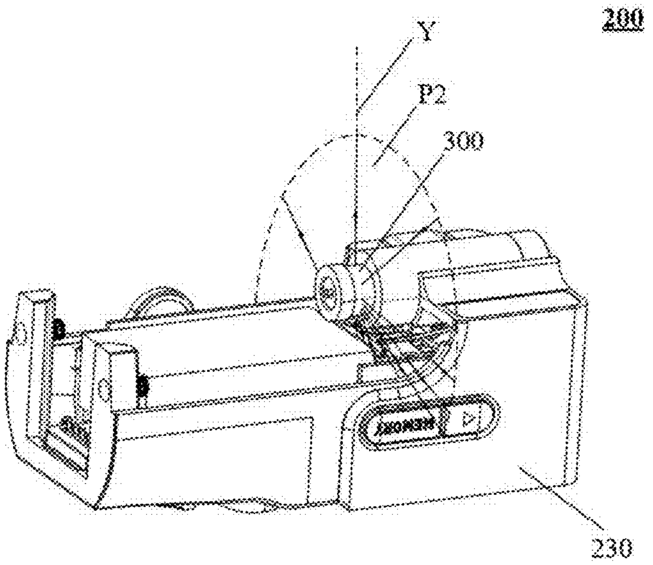
FIG. 29A is a partial structural schematic diagram of a measuring device provided according to some exemplary embodiments of the present disclosure.
Figure 29B:
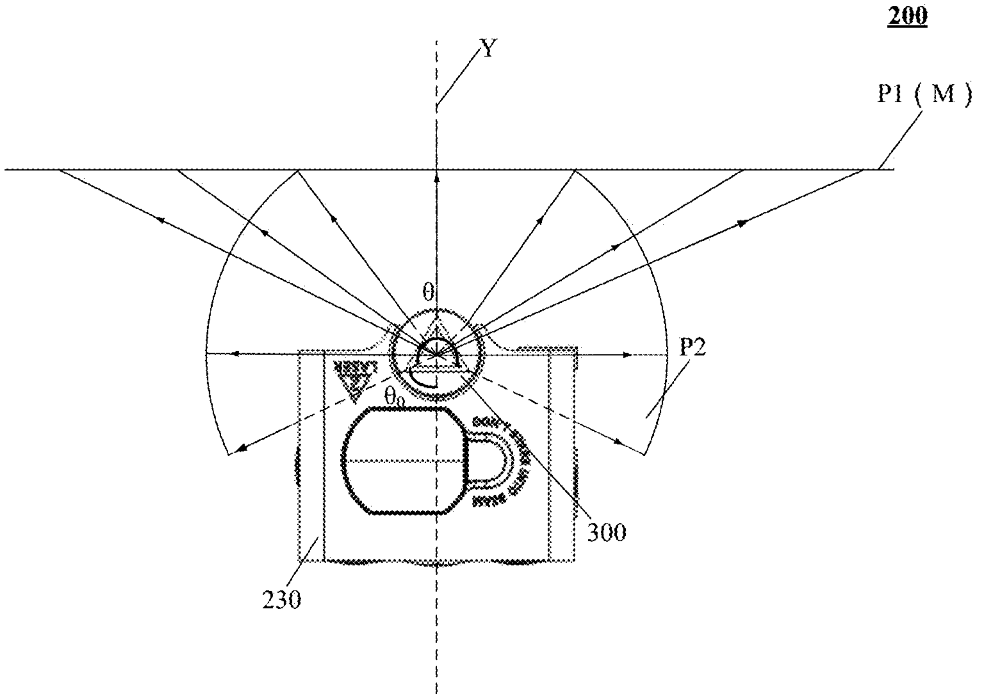
FIG. 29B is a schematic diagram of a field of view of laser provided according to some exemplary embodiments of the present disclosure.

A field of view radiated by the laser refers to an area composed of the laser that is reflected by the reflecting surface 321 and then exits to the outside of the measuring device 1000. FIG. 29A is a partial structural schematic diagram of a measuring device 1000 provided according to some exemplary embodiments of the present disclosure. FIG. 29B is a schematic diagram of a field of view of the laser provided according to some exemplary embodiments of the present disclosure. The description with respect to FIG. 29A is made by taking for example that the reflecting surface 321 included in the marking assembly 300 is the complete circular conical surface. Moreover, for ease of description, an adjusting direction Y is defined as a direction in which the laser, perpendicular to the target plane P1, of the laser of the marking plane P2 is located.

The laser emitter 310, when working, emits laser to a vertex of a cone-shaped reflecting element 320. Under the action of the conical surface, the laser forms an initial laser plane spreading 360° around. However, since the marking assembly 300 is mounted on a groove, part of the laser in the laser plane will be blocked by the laser ranging device 200 and other structures from exiting to the outside of the measuring device 1000, and the remaining laser will exit to the outside of the measuring device 1000 from both sides of the laser ranging device 200. The area composed of this part of laser is the field of view of the laser. As shown in FIG. 29B, an angle corresponding to the field of view is a field angle, denoted as θ. Because of being blocked by other assemblies, the field angle θ of the field of view of the laser is smaller than or equal to an angle of the initial laser plane. As shown in FIG. 29A, since there is a certain distance between a reflector 320 (not shown in FIG. 29) within the marking assembly 300 and the structure of the laser ranging device 200 in the measuring device 1000 provided herein, the laser having an angle of inclination relative to the adjusting direction Y being greater than a preset angle $\theta_0$ in the lower half circumference of laser of the 360° laser plane may exit to the outside of the second shell 230 such that a field angle of a total view of field with the unblocked laser exiting from two sides of the laser ranging device 200 is greater than 180°. The preset angle $\theta_0$ is an angle by which the laser that is just tangential with the second shell 230 in the laser plane and then exits from the measuring device 1000 deviates relative to the adjusting direction Y.

As shown in FIG. 29B, the marking assembly 300 is disposed at a middle position of the laser ranging device 200 such that the laser can exit from two sides of the measuring device 1000 at a same angle, and the corresponding laser markings M projected by the laser on the two sides into the target plane P1 are distributed symmetrically about the adjusting direction Y. The laser reflected by the conical surface separately exits from the two sides of the measuring device 1000 along the marking plane P2, and when the field angle θ of the field of view of the laser is greater than or equal to 180°, it means that there must be a beam of laser that is parallel to the target plane P1 in the marking plane P2 and it can be considered that the beam of laser can irradiate to the point at infinity in the target plane P1. Therefore, all the laser markings M formed by the laser irradiating onto the target plane P1 are infinitely long, and the infinitely long laser markings M can reach the reference point at any position.

In some embodiments, the marking assembly 300 may further include the marking adjusting assembly 330. The marking adjusting assembly 330 may be mechanically connected to the second shell 230, and a length of a laser marking in the target plane P1 is adjusted by adjusting the field of view of the laser.

The marking adjusting assembly 330 may include a light blocking element 331 such that the measuring device 1000, when running, has at least a first mode and a second mode. In the first mode, the light blocking element 331 is at a first position and the field of view has a first field angle such that the length of the laser marking in the target plane P1 is a first length. In the second mode, the light blocking element 331 is at a second position and the field of view has a second field angle such that the length of the laser marking in the target plane P1 is a second length. There are a plurality of options for implementing that the light blocking element 331 adjusts the length of the laser marking by blocking the laser, which will be described below separately by way of example.

Figure 30:
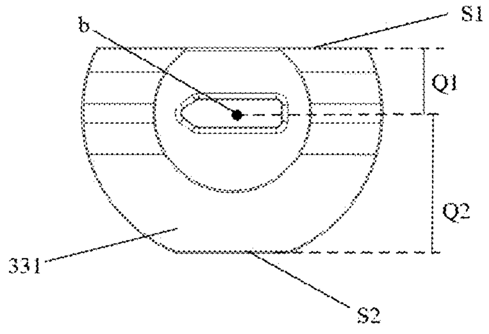
FIG. 30 is a structural schematic diagram of a light blocking element provided according to some exemplary embodiments of the present disclosure.

The marking adjusting assembly 330 may be designed into a rotational structure. The user may rotationally adjust the light blocking element 331, thereby adjusting a degree of blocking the laser. FIG. 30 is a structural schematic diagram of a light blocking element 331 provided according to some exemplary embodiments of the present disclosure. The light blocking element 331 may serve as a light blocking surface for blocking the laser in a laser exiting direction. The light blocking surface may include a first side S1 and a second side S2 (S2<S1) and then may block the laser with the first side S1 or the second S2 by rotating about an axis b. A distance of the first side S1 from the axis b is a first distance Q1, and a distance of the second side S2 from the axis b is a second distance Q2, Q2>Q1.

Figure 31A:
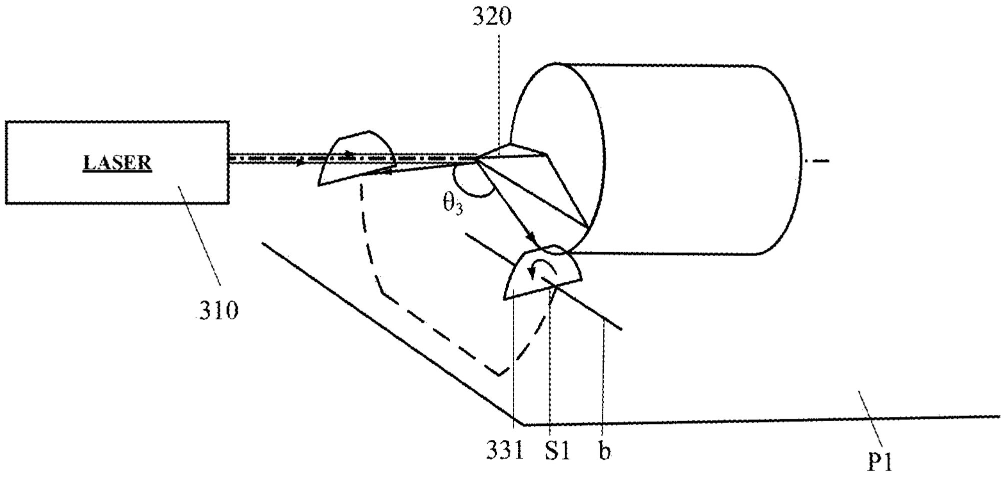
FIG. 31A is a schematic diagram of a light blocking element rotating to block light at a first position provided according to some exemplary embodiments of the present disclosure.
Figure 31B:
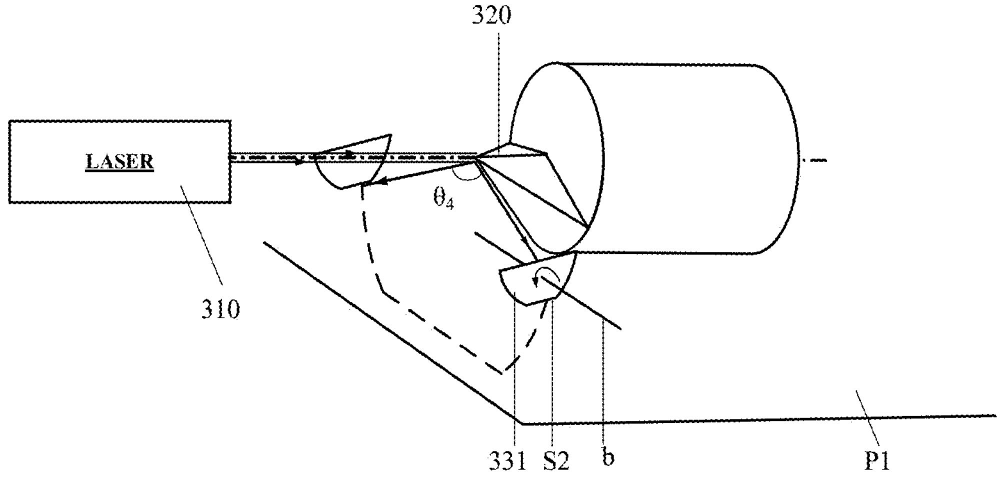
FIG. 31B is a schematic diagram of the light blocking element 331 rotating to block light at a second position provided according to some exemplary embodiments of the present disclosure.

FIG. 31A is a schematic diagram of a light blocking element 331 rotating to block light at a first position provided according to some exemplary embodiments of the present disclosure. FIG. 31B is a schematic diagram of the light blocking element 331 rotating to block light at a second position provided according to some exemplary embodiments of the present disclosure.

As shown in FIG. 31A, when the light blocking element 331 rotates to the first position, the first side S1 faces the target plane P1 to block light, thereby determining the first field angle $\theta_3$. As shown in FIG. 31B, when the light blocking element 331 rotates to the second position, the second side S2 faces the target plane P1 to block light, thereby determining the second field angle $\theta_4$. Since the first distance Q1 is smaller than the second distance Q2, it means that when the measuring device 1000 is placed on the target plane P1, the second side S2 is closer to the target plane P1 than the first side S1. Therefore, the second side S2 will block more laser close to the laser plane, causing less laser to exit, and the field of view of the laser may also be different, $\theta_3>\theta_4$.

In some embodiments, the user may slidably adjust the light blocking element 331, thereby adjusting the degree of blocking the laser by the light blocking element 331. The light blocking element 331 may be slidably connected to the second shell 230 in a direction in which the laser is reflected so that an amount of the blocked laser can be adjusted by sliding the light blocking element 331 between the first position and the second position.

Figure 32:
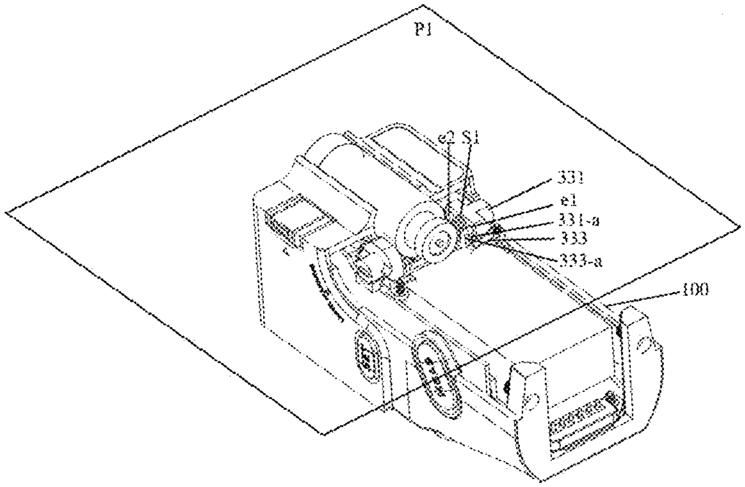
FIG. 32 is a schematic diagram of a pose of a marking adjusting assembly at a first position provided according to some exemplary embodiments of the present disclosure.

FIG. 32 is a schematic diagram of a pose of a marking adjusting assembly 330 at a first position provided according to some exemplary embodiments of the present disclosure. For the purpose of showing, the target plane P1 is located above the marking assembly 300.

The marking adjusting assembly 330 may include a bracket 333. The bracket 333 may be fixedly connected to the second shell 230. The light blocking element 331 is rotationally connected to the bracket 333 and thus may rotate about the axis b between the first position and the second position to adjust the amount of the blocked laser, thereby adjusting a field angle. A rotation range of the light blocking element 331 is limited by designing a structure between the light blocking element 331 and the bracket 333. For example, the light blocking element 331 may include a limiting slot 331-*a*. The limiting slot 331-*a* may be on one side of the light blocking element 331, e.g., in a direction toward the exiting laser. The limiting slot 331-*a* may be arc-shaped and has a first end e1 and a second end e2. Correspondingly, the bracket 333 may include a limit stop 333-*a*. The limit stop 333-*a* may be in the limiting slot 331-*a* and slidably connected to the limiting slot 331-*a*.

When the limit stop 333-*a* slides along the limiting slot 331-*a* to the first end e1 and presses against the first end e1, the light blocking element 331 rotates to the first position, and the limit stop 333-*a* prevents the light blocking element 331 from further rotating. The first side S1 of the light blocking element 331 faces the target plane P1 to block light, and the field angle of the field of view of the laser is the first field angle. When the limit stop 333-*a* slides along the limiting slot 331-*a* to the second end e2 and presses against the second end e2, the light blocking element 331 rotates to the second position, and the limit stop 333-*a* prevents the light blocking element 331 from further rotating. The second side S2 of the light blocking element 331 faces the target plane P1 to block light, and the field angle of the field of view of the laser is the second field angle.

When both of left and right light blocking elements 331 are located in the first position, the measuring device 1000 is in the first mode. Only the laser flush with the target plane P1 and the laser closer to the target plane P1 can emit the laser markings onto the target plane P1, forming the first field angle of 180°, where the half field angles corresponding to the left and right light blocking elements 331 are both 90°.

When both of the left and right light blocking elements 331 are located in the second position, the measuring device 1000 is in the second mode. At this time, the second side S2 of the light blocking element 331 is closer to the target plane P1 relative to the vertex of the conical surface of the reflecting element 320, and the second side S2 is higher than the second shell 230 such that the light blocking element 331 blocks the laser having the angle of inclination of less than 15° relative to the target plane P1 in the reflected laser, forming the second field angle of 150°, where the half field angles corresponding to the left and right light blocking elements 331 are both 75°.

Likewise, when the left light blocking element 331 is in the first position and the right light blocking element 331 is in the second position, the measuring device 1000 is in a third mode, and the field angle of the corresponding third field of view is 165°, where the left half field angle is 90° and the corresponding laser marking is infinitely long; and the right half field angle is 75° and the corresponding laser marking is finitely long.

When the left light blocking element 331 is in the second position and the right light blocking element 331 is in the first position, the measuring device 1000 is in a fourth mode, and the field angle of the corresponding fourth field of view is 165°, where the left half field angle is 75° and the corresponding laser marking is finitely long; and the right half field angle is 90° and the corresponding laser marking is infinitely long.

In some embodiments, an outer edge of the light blocking surface may be in an involute form to continuously adjust the amount of the blocked laser. The light blocking element 331 may also change the amount of the blocked laser discontinuously.

To guarantee that the laser marking can reach the reference point at any position, in addition to the above solutions, the laser marking emitted by the marking assembly 300 to the target plane P1 may be set to be adjustable in length.

Figure 33A:
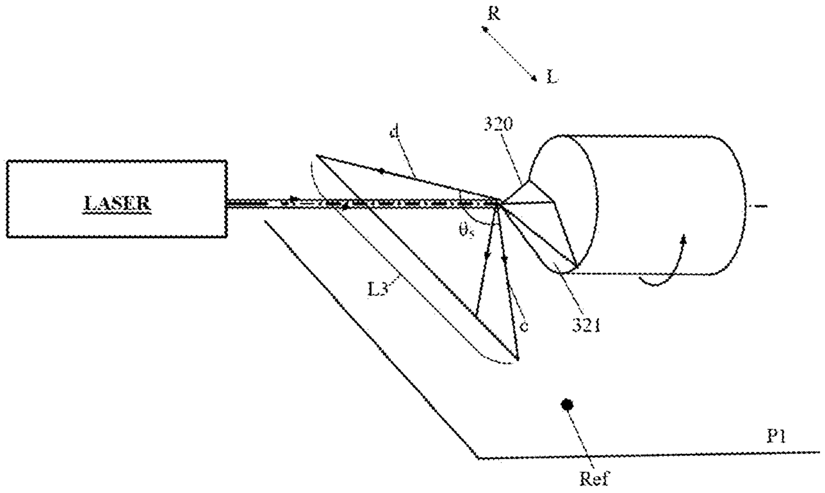
FIG. 33A is a pose diagram of a reflecting element provided according to some exemplary embodiments of the present disclosure.
Figure 33B:
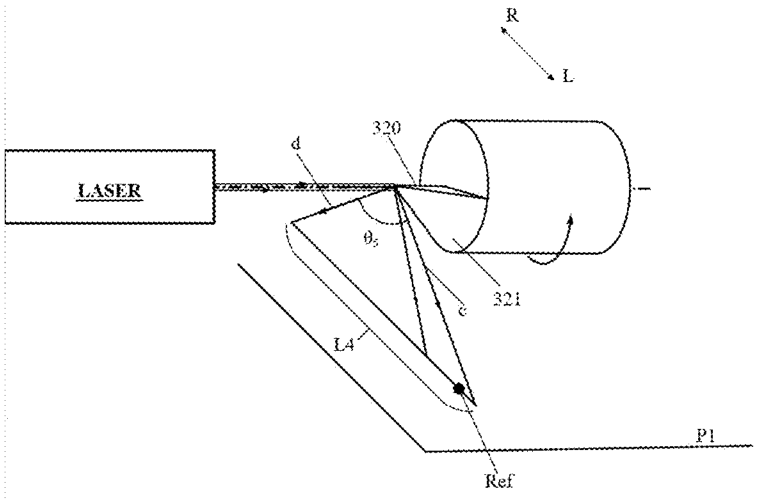
FIG. 33B is a pose diagram of a rotated reflecting element provided according to some exemplary embodiments of the present disclosure.

FIG. 33A is a pose diagram of a reflecting element 320 provided according to some exemplary embodiments of the present disclosure. FIG. 33B is a pose diagram of a rotated reflecting element 320 provided according to some exemplary embodiments of the present disclosure. The reflecting element 320 is rotationally mounted in the second shell 230. The reflecting element 320, when rotating, may reflect the laser in a corresponding direction to adjust the orientation of the field of view of the laser, thus adjusting the length of the laser marking in the target plane P1.

For ease of description, the left (L) and right (R) direction of the reflecting element 320 are defined with a direction pointed by the vertex of the conical reflecting surface 321 in the measuring device 1000 as a forward direction. The reflecting surface 321 may be part of a circular conical surface. Under the action of the part of the conical surface, the laser forms an initial laser plane spreading around at an angle $\theta_5$. $\theta_5$ is less than 180°. The following description is made by taking for example that the field of view roughly faces the target plane P1.

An initial pose of the reflecting element 320 is as shown in FIG. 33A, and the length of the laser marking of the reflecting element 320 in the target plane P1 is L3. Along an irradiation direction of the incident laser to the reflecting element 320, the pose of the reflecting element 320 rotated by the user in a counterclockwise direction is as shown in FIG. 33B. At this time, compared with FIG. 33A, the length of the laser marking in the target plane P1 changes from L3 to L4, and the position thereof moves leftwards. As can be seen from the figure, the laser marking before rotating in FIG. 33A cannot irradiate onto the reference point Ref on the left side (L) of the reflecting element 320, and by rotating the reflecting element 320 counterclockwise in the arrow direction in the figure (FIG. 33B), the length of the laser marking on the right side (R) of the reflecting element 320 decreases while the length on the left side (L) increases. Finally, the length of the laser marking emitted by the rotated reflecting element 320 on the left side (L) is long enough to pass through the reference point Ref. In this process, the field angle $\theta_5$ does not change. Therefore, the degree of the field angle of the laser that can be reflected by the reflecting element 320 does not need to be defined, and by rotating the reflecting element 320, the laser marking can definitely pass through the reference point Ref at any position. Likewise, when the laser marking of the reflecting element 320 needs to be able to reach the reference point on the right side (R) of the reflecting element 320, the reflecting element 320 may be rotated clockwise (in a direction opposite to the arrow) such that the length of the laser marking on the left side (L) of the reflecting element 320 decreases and the length of the laser marking on the right side (R) increases to pass through the reference point.

The foregoing describes the specific embodiments of the present disclosure. Other embodiments fall within the scope of the appended claims. In some cases, the actions or steps described in the claims may be performed in sequences different from those in the embodiments and still achieve expected results. In addition, the processes depicted in the accompanying drawings do not necessarily require the specific orders or sequential orders shown for achieving the expected results. In some implementations, multitasking and parallel processing are also possible or may be advantageous.

In summary, after reading this detailed disclosure, those skilled in the art can understand that the foregoing detailed disclosure may be presented by way of example only, and may not be limited. Although there is no clear description, those skilled in the art can understand that the present disclosure intends to cover various reasonable changes, improvements, and modifications of the embodiments. These changes, improvements, and modifications are intended to be proposed in the present disclosure and are within the spirit and scope of the exemplary embodiments of the present disclosure.

In addition, some specific terms in the present disclosure have been used to describe the embodiments of the present disclosure. For example, "one embodiment", "an embodiment", and/or "some embodiments" mean that a specific feature, structure, or characteristic described in combination with the embodiment may be included in at least one embodiment of the present disclosure. Therefore, it can be emphasized and should be understood that two or more references to "an embodiment" or "one embodiment" or "an alternative embodiment" in various parts of the present disclosure do not necessarily all refer to the same embodiment. In addition, specific feature, structure, or characteristic may be appropriately combined in one or more embodiments of the present disclosure.

It should be understood that in the foregoing description of the embodiments of the present disclosure, to help understand a feature, and for the purpose of simplifying the present disclosure, the present disclosure sometimes combines various features in a single embodiment, a drawing, or description thereof. However, this does not mean that the combination of these features is necessary. It is entirely possible for those skilled in the art to extract some of the features as a single embodiment for understanding when reading the present disclosure. In other words, the embodiments in the present disclosure can also be understood as an integration of multiple sub-embodiments. The content of each sub-embodiment is also true when it is less than all the characteristics of a single previously disclosed embodiment.

Each patent, patent application, patent application publication and other materials cited herein, such as articles, books, specifications, publications, documents, articles and the like, may be incorporated herein by reference. The entire content used for all purposes, except for any related litigation document history, may be inconsistent or conflicting with this document, or any identical litigation document that may have restrictive influence on the broadest scope of the claims' history. Those are associated with this document now or in the future. For example, if the description, definition, and/or use of terms in any associated materials contained herein is inconsistent with or in conflict with that in this document, the terms in this document shall prevail.

Finally, it should be understood that the embodiment of the present disclosure provided herein is an explanation of the principle of the embodiment of the present disclosure. Other modified embodiments are also within the scope of the present disclosure. Therefore, the embodiments disclosed in the present disclosure are merely examples rather than limitations. Those skilled in the art can adopt alternative configurations according to the embodiments in the present disclosure to implement the present disclosure in the present disclosure. Therefore, the embodiments of the present disclosure are not limited to those exactly described in the present disclosure.

What is claimed is:

1. A tape measure, comprising:

a first shell having a first outlet;

a tape including one end mounted in the first shell and another end extending out of the first shell through the first outlet and configured to move in a first measuring direction relative to the first shell, wherein a surface of the tape comprises position identifiers at a plurality of preset positions; and an optical positioning assembly connected to the first shell and including:

an imaging sensor mounted in the first shell opposite to the surface of the tape, and configured to, during operation, consecutively acquire images of the tape in a moving process and perform feature comparison on the images to determine a relative displacement of the tape moving in the first measuring direction in real time, a first controller in communication with the imaging sensor and configured to, during operation, receive the relative displacement and determine in real time, based on the relative displacement, a length by which the tape extends out of the first shell, and a position identification sensor, in communication with the first controller, disposed in the first shell opposite to a side of the tape having a position identifiers, and configured to, during operation, read the position identifier on the tape that passes by the position identification sensor in the moving process to generate a corresponding absolute position signal, and transmit the absolute position signal to the first controller.

2. The tape measure according to claim 1, wherein the first controller further performs the following operations:

receiving the absolute position signal, determining, based on the absolute position signal, an absolute length corresponding to the absolute position signal, and resetting, based on the absolute position signal, a relative length obtained by accumulating the received relative displacements to zero, and determining, based on the relative displacement and the absolute length received after resetting to zero, the length by which the tape extends out of the first shell.

3. The tape measure according to claim 2, wherein the tape measure has at least one of the following features:

a surface roughness of a side, facing the imaging sensor, of the tape is within an identification range of the imaging sensor; or the tape measure further comprises at least one of a first spacing piece or a second spacing piece, the first spacing piece is disposed in the first shell and configured to maintain a distance between the imaging sensor and the tape in a first working range during an operation of the imaging sensor, and the second spacing piece is disposed in the first shell and configured to maintain a distance between the position identification sensor and the tape in a second working range during an operation of the position identification sensor.

4. The tape measure according to claim 1, wherein the imaging sensor comprises:

an imaging component configured to capture images at a preset frequency to consecutively acquire the images of the tape in the moving process, wherein the preset frequency allows images acquired by the imaging sensor at adjacent time points to be superposed at least in part;

an image processing circuit in communication with the imaging component and configured to perform feature comparison on the images to determine a relative displacement of the tape in the first measuring direction in real time; and a light source disposed on a same side of the tape with the imaging component and configured to emit light to the tape.

5. The tape measure according to claim 1, further comprising a brake assembly mounted on the first shell and including:

a braking component mounted in the first shell and configured to come into contact with or be separated from the tape to realize braking or release of the tape; and an execution component mounted on the first shell and including a first triggering surface and a second triggering surface, wherein the first triggering surface and the second triggering surface receive triggering forces in different directions, respectively;

and when any one of the first triggering surface and the second triggering surface is triggered, the execution component drives the braking component to come into contact with or be separated from the tape, wherein the second triggering surface is inclined at an included angle toward the tape relative to the first triggering surface.

6. The tape measure according to claim 5, wherein the execution component comprises:

an execution body including the first triggering surface and the second triggering surface; and a connecting piece movably mounted in the first shell and configured to move in a first direction relative to the first shell to drive the braking component, wherein the execution body is movably connected to the connecting piece, and when any one of the first triggering surface and the second triggering surface is triggered, the execution body drives the connecting piece to move in the first direction to drive the braking component.

7. The tape measure according to claim 6, wherein the execution body further comprises:

a rotational connection portion in rotational connection with the connecting piece, wherein a rotation center of the rotational connection is disposed opposite to the first triggering surface and eccentrically from the second triggering surface; and a rotation limiting portion configured to limit an angle at which the execution body rotates relative to the connecting piece, wherein when the first triggering surface is triggered, the execution body drives, via the rotational connection, the connecting piece to move in the first direction, and when the second triggering surface is triggered, the execution body rotates relative to the connecting piece, and the rotation limiting portion limits the rotation of the execution body, causing the execution body to drive the connecting piece to move in the first direction.

8. The tape measure according to claim 7, wherein the second triggering surface is located at an end of the first triggering surface, the rotation limiting portion is located at an end, far away from the second triggering surface, of the first triggering surface, the rotational connection portion is located between the second triggering surface and the rotation limiting portion; and the first shell comprises a limiting member located on a side, far away from the connecting piece, of the execution body and disposed opposite to the rotation limiting portion, wherein when the second triggering surface is triggered, the execution body rotates relative to the connecting piece, and the limiting member presses against the rotation limiting portion to limit the rotation of the execution body, thus causing the execution body to drive, via the rotational connection portion, the connecting piece to move in the first direction.

9. The tape measure according to claim 6, wherein the tape measure has at least one of the following features:

the execution body is in sliding connection with the connecting piece in a second direction not perpendicular to the first direction, the first shell comprises a sliding limiting portion configured to limit the movement of the execution body away from the first shell in the first direction, wherein when the first triggering surface is triggered, the execution body drives, via the sliding connection, the connecting piece to move in the first direction, and when the second triggering surface is triggered, the execution body slides relative to the connecting piece in the second direction, and the execution body is limited by the sliding limiting portion from moving in the first direction relative to the first shell, thus causing the execution body to drive the connecting piece to move in the first direction; or the connecting piece comprises a guiding portion disposed in the first direction and slidably connected to the first shell in the first direction.

10. The tape measure according to claim 5, wherein the tape measure meets at least one of the following conditions:

the execution component and the braking component are located on two sides of the tape, respectively, when both of the first triggering surface and the second triggering surface are not triggered, the braking component is in contact with the tape to realize braking of the tape, when any one of the first triggering surface and the second triggering surface is triggered, the execution component presses against the braking component and drives the braking component to be separated from the tape to release the tape, and the braking component comprises:

a first braking body movably connected to the first shell, and an elastic driving body having one end connected to the first shell and the other end connected to the first braking body such that the first braking body is driven by an elastic force of the elastic driving body to come into contact with the tape, thereby realizing the braking of the tape, wherein when any one of the first triggering surface and the second triggering surface is triggered, the execution component presses against the first braking body and compresses the elastic driving body to drive the first braking body to be separated from the tape, thereby releasing the tape; or the execution component and the braking component are located on a same side of the tape, when both of the first triggering surface and the second triggering surface are not triggered, the braking component is separated from the tape to unbrake the tape, when any one of the first triggering surface and the second triggering surface is triggered, the execution component presses against the braking component and drives the braking component to come into contact with the tape to realize the braking of the tape, and the braking component comprises a second braking body connected to the execution component, wherein when any one of the first triggering surface and the second triggering surface is triggered, the execution component drives the second braking body to move to drive the second braking body to come into contact with the tape, thereby realizing the braking of the tape.

11. A measuring device, comprising:

a tape measure, including:

a first shell having a first outlet, a tape including one end mounted in the first shell and another end extending out of the first shell through the first outlet and configured to move in a first measuring direction relative to the first shell, and an optical positioning assembly connected to the first shell and including:

an imaging sensor mounted in the first shell opposite to a surface of the tape, and configured to, during operation, consecutively acquire images of the tape in a moving process and perform feature comparison on the images to determine a relative displacement of the tape moving in the first measuring direction in real time, and a first controller in communication with the imaging sensor and configured to, during operation, receive the relative displacement and determine in real time, based on the relative displacement, a length by which the tape extends out of the first shell; and a laser ranging device connected to the tape measure, including:

a second shell provided with a second outlet, and a laser measuring portion disposed in the second shell and configured to, during operation, measure a distance in a second measuring direction via the second outlet.

12. The measuring device according to claim 11, wherein the tape measure further comprises a first connection portion connected to the first shell; and the laser ranging device further comprises a second connection portion connected to the second shell, wherein the first connection portion is detachably connected to the second connection portion such that the tape measure is coupled with the laser ranging device to realize distance measurements in different ways, and wherein the different ways include at least one of measuring in different directions, or measuring over different measuring ranges.

13. The measuring device according to claim 12, wherein the first outlet and the second outlet are located on a same side of the first connection portion, and the first measuring direction is the same as the second measuring direction; or the first outlet and the second outlet are located on two sides of the first connection portion, and the first measuring direction is opposite to the second measuring direction; or the first outlet is perpendicular to the second outlet, and the first measuring direction is perpendicular to the second measuring direction; or the measuring device has at least one of the following features: the first connection portion is rotationally connected to the first shell, or the second connection portion is rotationally connected to the second shell such that an included angle between the first measuring direction and the second measuring direction is adjustable.

14. The measuring device according to claim 12, wherein one of the first connection portion and the second connection portion comprises a first connecting mechanism, and the other one comprises a second connecting mechanism, and the first connecting mechanism matches the second connecting mechanism;

one of the first connection portion and the second connection portion further comprises a clamping slot, and the other one further comprises a spring clamping point, wherein when the first connection portion is connected to the second connection portion, the first connecting mechanism is slidably connected to the second connecting mechanism in a sliding direction until the spring clamping point is clamped into the clamping slot, so as to realize fixed connection between the first connection portion and the second connection portion.

15. The measuring device according to claim 12, further comprising a marking assembly, the marking assembly being connected to at least one of the tape measure or the laser ranging device, and the marking assembly being configured to, when running, emit laser along a marking plane to a target plane, such that a laser marking passing through a reference point is irradiated by the laser in the target plane, the reference point comprising a reference point during ranging by the tape measure and/or the laser ranging device, wherein the marking assembly comprises a marking adjusting assembly to adjust a length of the laser marking in the target plane.

16. The measuring device according to claim 15, wherein the marking assembly comprises:

a laser emitter configured to, when running, emit the laser to a reflecting surface; and a reflecting element rotationally mounted on at least one of the tape measure or the laser ranging device, the reflecting element including the reflecting surface and configured to reflect the laser along the marking plane such that the laser irradiates onto the target plane to form the laser marking, wherein the reflecting element, when rotating, reflects the laser in a corresponding direction to adjust an orientation of a field of view of the laser, thus adjusting the length of the laser marking in the target plane.

17. The measuring device according to claim 16, wherein the marking adjusting assembly is configured to adjust the length of the laser marking in the target plane by adjusting a field angle of the laser;

the marking adjusting assembly comprises a light blocking element, and the measuring device, when running, has at least a first mode and a second mode;

in the first mode, the light blocking element is at a first position and the field of view has a first field angle such that the length of the laser marking in the target plane is a first length; and in the second mode, the light blocking element is at a second position and the field of view has a second field angle such that the length of the laser marking in the target plane is a second length.

18. A measuring method for a tape measure, comprising:

consecutively acquiring, by an imaging sensor, images of a tape in a moving process, and performing feature comparison on the images to determine a relative displacement of the tape moving in a first measuring direction in real time; and receiving, by a first controller, the relative displacement, and determining in real time, based on the relative displacement, a length by which the tape extends out of a first shell.

19. The measuring method according to claim 18, wherein the performing of the feature comparison on the images to determine a relative displacement of the tape moving in the first measuring direction in real time comprises performing the following operations on each image of the images:

performing feature comparison on a current image and an adjacent previous image to determine target feature points having a same feature in the two images, and determining, based on a first position of a target feature point in the current image and a second position of the target feature point in the previous image, a relative displacement of the tape in the first measuring direction in the current image relative to the previous image; and the determining in real time, based on the relative displacement, of the length by which the tape extends out of the first shell comprises:

adding the relative displacement corresponding to the current image to a relative length corresponding to the previous image to obtain a relative length corresponding to the current image, and adding a pre-stored initial length by which the tape extends out of the first shell to the relative length corresponding to the current image in real time to obtain the length by which the tape extends out of the first shell in real time.

20. The measuring method according to claim 19, further comprising:

providing a surface of the tape with corresponding position identifiers at a plurality of preset positions, and the optical positioning assembly further comprises a position identification sensor in communication with the first controller; reading, by the position identification sensor, the position identifier on the tape that passes by the position identification sensor in the moving process, and generating a corresponding absolute position signal and transmitting the absolute position signal to the first controller; and receiving, by the first controller, the absolute position signal, and resetting, based on the absolute position signal, a relative length obtained by accumulating the received relative displacements to zero, wherein the determining in real time, based on the relative displacement, a length by which the tape extends out of the first shell comprises:

identifying, based on the absolute position signal, an absolute length corresponding to the absolute position signal, and accumulating the absolute length with the relative displacement received after resetting to zero in real time to obtain the length by which the tape extends out of the first shell in real time.

* * * * *